United States Patent
Asatani et al.

(10) Patent No.: US 6,631,056 B1
(45) Date of Patent: Oct. 7, 2003

(54) THIN FILM MAGNETIC HEAD ASSEMBLY AND METHOD OF MANUFACTURING THE SAME

(75) Inventors: Takashi Asatani, Tokyo (JP); Fujimi Kimura, Tokyo (JP); Junichi Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/584,267

(22) Filed: Jun. 1, 2000

(30) Foreign Application Priority Data

Jun. 10, 1999 (JP) .......................... 11-164501
May 17, 2000 (JP) ........................ 2000-145657

(51) Int. Cl.$^7$ ............................................... G11B 5/40
(52) U.S. Cl. ..................................................... 360/323
(58) Field of Search ................................. 360/323, 313

(56) References Cited

U.S. PATENT DOCUMENTS

| | | | |
|---|---|---|---|
| 5,465,186 A | * 11/1995 | Bajorek et al. | 29/603.04 |
| 5,491,605 A | * 2/1996 | Hughbanks et al. | 360/128 |
| 5,792,569 A | * 8/1998 | Sun et al. | 324/252 |
| 5,805,390 A | 9/1998 | Takeura | 360/323 |
| 6,063,491 A | * 5/2000 | Fujikata et al. | 324/252 |
| 6,163,437 A | * 12/2000 | Inage et al. | 360/128 |
| 6,331,924 B1 | * 12/2001 | Takada | 360/128 |

FOREIGN PATENT DOCUMENTS

| | | |
|---|---|---|
| JP | A-61-77114 | 4/1986 |
| JP | A-8-293108 | 5/1996 |
| JP | A-8-167123 | 6/1996 |

* cited by examiner

Primary Examiner—Carl Whitehead, Jr.
Assistant Examiner—Jennifer M Dolan
(74) Attorney, Agent, or Firm—Oliff & Berridge, PLC

(57) ABSTRACT

On a wafer-like substrate 1, there are formed a number of thin film magnetic head elements in matrix, each of which is formed to include a first shield film 3 formed on the wafer-like substrate 1, a first insulating film 71 formed on the first shield film, a magnetoresistive element 9 and first and second electrode films 11, 13 connected to respective ends of the magnetoresistive element formed on the first insulating film, a second shield film 5 formed to cover the magnetoresistive element and first and second electrode films 11, 13, a second insulating film 72 formed on the second shield film, and a conductive film 191 electrically connected to the first electrode film 11 and second shield film 5 and having a middle portion which is separated from a side edge of the second shield film 5 by a distance ΔG2 viewed in a film stacking direction. Since the first electrode film 11 and second shield film 5 become equipotential, no voltage is applied across the first and second insulating films 71, 72 and dielectric breakdown does not occur. By cutting the middle portion of the conductive film 191, property of the magnetoresistive element can be measured. Since the middle portion of the conductive film 191 situates outside the second shield film 5, a generation of conductive material debris upon cutting can be prevented, and a cut surface of the first electrode film 11 and second shield film 5 are not short-circuited.

48 Claims, 32 Drawing Sheets

THIN FILM MAGNETIC HEAD ASSEMBLY AND METHOD OF MANUFACTURING THE SAME

BACKGROUND OF THE INVENTION

1. Field of the Invention

The present invention relates to a thin film magnetic head assembly and a method of manufacturing the same. According to the invention, the thin film magnetic head assembly includes both a wafer type and a bar type. In the wafer type thin film magnetic head assembly, a substrate is a wafer and a plurality of thin film magnetic head elements are arranged in matrix on the substrate. In the bar type thin film magnetic head assembly, a substrate is formed by a bar and a plurality of thin film magnetic heads are aligned in a longitudinal direction of the bar. The bar type thin film magnetic head assembly may be obtained by cutting the wafer type thin film magnetic head assembly.

2. Description of the Related Art

In a thin film magnetic head having a reading element constituted by a magnetoresistive element such as spin valve film or ferromagnetic tunnel junction element, the magnetoresistive element and its electrode films are embedded in an insulating film made of alumina, and first and second shield films are provided on respective sides of the insulating film. In this structure, when damage or dielectric breakdown occurs in the insulating film provided between the electrode films and the first or second shield film, there might be generated large electric noise, and an electromagnetic conversion property might be degraded.

Japanese Patent Application Laid-open Publications, Kokai Hei 8-293108, Kokai Sho 61-7714 and Kokai Hei 8-167123 and U.S. Pat. No. 5,805,390 have proposed techniques for reducing the degradation of the insulating property and avoiding the dielectric breakdown.

In the Kokai Hei 8-293108, during a wafer process in which various processes are conducted without cutting or dividing a wafer, an electric connection between the electrode films and shield films is maintained, and after the wafer process, this electrical connection is cut off. However, during the wafer process, an electrical insulating property between the electrode films and the shield films could not be measured, and therefore after cutting the wafer or bar into respective thin film magnetic heads, the measurement of the insulating property. One could not know a possible degradation of insulating property or dielectric breakdown which might be generated during the wafer process. Then, a manufacturing yield is decreased, and it is necessary to measure the insulating property for individual thin film magnetic heads. It is apparent that such a checking work is very cumbersome.

In the Kokai Sho 61-7714, there is disclosed a magnetoresistive type thin film magnetic head in which upper and lower shield films are electrically connected to each other to keep these shield films equipotential, and no electrostatic charge is stored during the operation. However, in this known magnetoresistive type thin film magnetic head, insulating property of an insulating film sandwiched between the shield film and an electrode film could not be measured, and therefore manufacturing yield is low.

In the Kokai Hei 8-167123, upon manufacturing a magnetoresistive type thin film magnetic head, upper and lower shield films, electrode films and a magnetoresistive element film are connected to each other during the wafer process, and they are separated from each other after the wafer process. However, also in this known magnetoresistive type thin film magnetic head, insulating property of an insulating film between a shield film and an electrode film could not be measured, and thus sufficiently high manufacturing yield could not be attained.

Furthermore, in the U.S. Pat. No. 5,805,390, in order to protect a MR element against the dielectric breakdown during a time period from the formation of the MR element to the installation of a MR head onto a recording and reproducing device, upper and lower shield films are short-circuited during the wafer process, and after the wafer process, upper and lower shields are connected to each other via a resistor. In this known technique, a manufacturing process becomes rather complicated and manufacturing cost is increased owing to the reason that the upper and lower shields have to be short-circuited not only during the wafer process but also after the wafer process.

SUMMARY OF THE INVENTION

The present invention has for its object to provide a thin film magnetic head assembly as well as a method of manufacturing the same, in which degradation or dielectric breakage of the insulating films provided between the shield films and electrode films can be effectively prevented during the manufacturing process.

It is another object of the invention to provide a thin film magnetic head assembly as well as a method of manufacturing the same, in which an insulating property of insulating films between shield films and electrode films can be measured.

It is still another object of the invention to provide a thin film magnetic head assembly and a method of manufacturing the same, in which shield films and electrode films can be isolated without injuring the shield films.

According to the invention, a thin film magnetic head assembly includes a substrate and a plurality of thin film magnetic head elements provided on the substrate, wherein each of said thin film magnetic head element comprises:

a first shield film formed to be supported by said substrate;

a first insulating film formed on said first shield film:

a magnetoresistive element formed on the first insulating film;

first and second electrode films formed on said first insulating film to be connected to respective end portions of the magnetoresistive element;

a second insulating film formed to cover said magnetoresistive element as well as said first and second electrode films;

a second shield film formed on said second insulating film; and a conductive film formed on said first insulating film such that the conductive film extends outside said second shield film viewed in a film stacking direction and is connected to at least one of said first and second electrode films as well as to at least one of said first and second shield films.

In the thin film magnetic head assembly according to the invention, in each of the thin film magnetic head elements, the first insulating film is formed on the first shield film and the magnetoresistive element and first and second electrode films are formed on the first insulating film, and thus the magnetoresistive element and first and second electrode films are shielded by the first shield film when the substrate is divided into respective thin film magnetic heads. Furthermore, since the first and second electrode films and magnetoresistive element are covered with the second insulating film and second insulating film is covered with the second shield film, the magnetoresistive element and first and second electrode films are shielded also by the second shield film.

Each of a plurality of the thin film magnetic head elements of the thin film magnetic head assembly according to the invention includes the conductive film. This conductive film is provided on the first insulating film to extend outside at least of the second shield film among the first and second shield films and is electrically connected to at least one of the first and second electrode films as well as to at least one of the first and second shield films. For the sake of simplicity, now a case in which the conductive film is connected to the first electrode film and second shield film will be explained. In this case, the first electrode film becomes equipotential with the second shield film, and the second electrode film becomes equipotential with the first electrode film via the second shield film, and thus the second electrode film becomes equipotential with the second shield film. Therefore, during the wafer process, no voltage is applied across the second insulating film provided between the first and second electrode films and the second shield film. In this manner, the second insulating film can be prevented from being damaged or broken due to the electrostatic charge.

When the conductive film is electrically connected to the first electrode film and first shield film, the first and second electrode films become equipotential with the first shield film. Therefore, no voltage is applied across the first insulating film provided between the first and second electrode films and the first shield film during the wafer process, and therefore the first insulating film can be protected against damage or dielectric breakdown.

In a preferable embodiment of the thin film magnetic head assembly according to the invention, said conductive film is connected both to the first and second electrode films and to the first and second shield films. In-this case, during the wafer process, no voltage is applied across the first insulating film provided between the first and second electrode films and the first shield film as well as across the second insulating film provided between the first and second electrode films and the second shield film, both the first and second insulating films can be protected against damaged or dielectric breakdown.

In another preferable embodiment of the thin film magnetic head assembly according to the invention, said conductive film is electrically connected both to the first and second electrode films. In this case, the magnetoresistive element is short-circuited by means of the first and second electrode films and conductive film, and therefore the magnetoresistive element can be protected.

The structure in which the conductive film is electrically connected both to the first and second electrode films can provide not only the above mentioned merits for the thin film magnetic head assembly, but also extremely high utility for the method of manufacturing the thin film magnetic head assembly. That is to say, by cutting the conductive film, the first or second electrode film can be electrically separated from the first or second shield film. After this cutting process, the insulating property of the insulating film can be measured. The above mentioned cutting operation and the measurement of the insulating property may be performed on the wafer or bar. Therefore, the measurement of the insulating property can be carried out very easily.

As explained above, the conductive film extends outside at least the second shield film viewed in the film stacking direction. Therefore, the conductive film can be cut at an area where the second shield film is not influenced by the cutting operation. Therefore, a generation of conductive material debris caused by cutting the conductive film can be prevented, and thus a short-circuit between the second electrode film and the second shield film caused by adhesion of conductive material debris onto cut surfaces of these films can be also prevented. It is preferable to form the conductive film to extends outside both the first and second shield films. In this structure, the conductive film can be cut at an area at which both the first and second shield films are not existent.

In another preferable embodiment of the thin film magnetic head assembly according to the invention, each of the thin film magnetic head elements includes a third insulating film, a first terminal conductor, a second terminal conductor and a third terminal conductor. Said third insulating film constitutes an outermost layer of the thin film magnetic head. Said first terminal conductor is electrically connected to said second shield film and is covered with said third insulating film. Said second terminal conductor is electrically connected to said first electrode film and is covered with said third insulating film. Said third terminal conductor is electrically connected to said second electrode film and is covered with said third insulating film.

In this thin film magnetic head assembly, end surfaces of said first, second and third terminal conductors may be exposed in the surface of the third insulating film by, for instance, polishing. Then, the insulating property of a number of thin film magnetic head elements can be measured simultaneously by contacting an probe array having an arrangement pattern corresponding to that of the first to third terminal conductors to the exposed end surfaces of these terminal conductors.

After cutting the conductive film and measuring the insulating property, the thin film magnetic head assembly may include an electrically conductive paste layer. This conductive paste layer may be applied on the surface of the third insulating film and the end surfaces of the first, second and third terminal conductors such that the first, second and third terminal conductors are electrically connected to each other.

In such an embodiment of the thin film magnetic head assembly, the first and second terminal conductors connected to the first and second electrode films are electrically connected to the third terminal conductor connected to the first and second shield films by means of the conductive paste layer. Therefore, the first and second electrode films can be kept equipotential with the first and second shield films. Then, the first insulating film and magnetoresistive element can be prevented from being broken due to the electrostatic charge during a process after the measurement of the insulating property.

In another embodiment of the thin film magnetic head assembly according to the invention, each of the thin film magnetic head elements includes at least one metal film provided on the first insulating film at a position corresponding to a middle portion of the conductive film, and is covered with said third insulating film.

Upon manufacturing such a thin film magnetic head assembly, said third insulating film is ground or polished to expose an end surface of said metal film, and then the metal film is removed by etching. After that, said conductive film is cut at its middle potion through a hole formed by removing the metal film.

Furthermore, as an addition step, after cutting the conductive film at its middle portion, an insulating resistance of the first or second insulating film may be measured across the first terminal conductor and at least one of the second and third terminal conductors. In this manner, the insulating property of the first or second insulating film can be measured.

DESCRIPTION OF THE PREFERRED EMBODIMENTS

As stated in the preamble, the thin film magnetic head assembly according to the invention includes both the wafer type and bar type. In the wafer type thin film magnetic head assembly, the substrate is formed by a wafer and a number of thin film magnetic head elements are arranged on the wafer in matrix. In the bar type thin film magnetic head assembly, the substrate is formed by a bar and a plurality of thin film magnetic head elements are aligned along a longitudinal direction of the bar (in general a single array). The bar type thin film magnetic head assemblies are obtained by cutting the wafer type thin film magnetic head assembly. In the specification of the present application, the wafer type thin film magnetic head assembly will be mainly explained, but almost all explanation about the bar type thin film magnetic head assembly may be equally applied to the bar type thin film magnetic head assembly.

Figure 1:
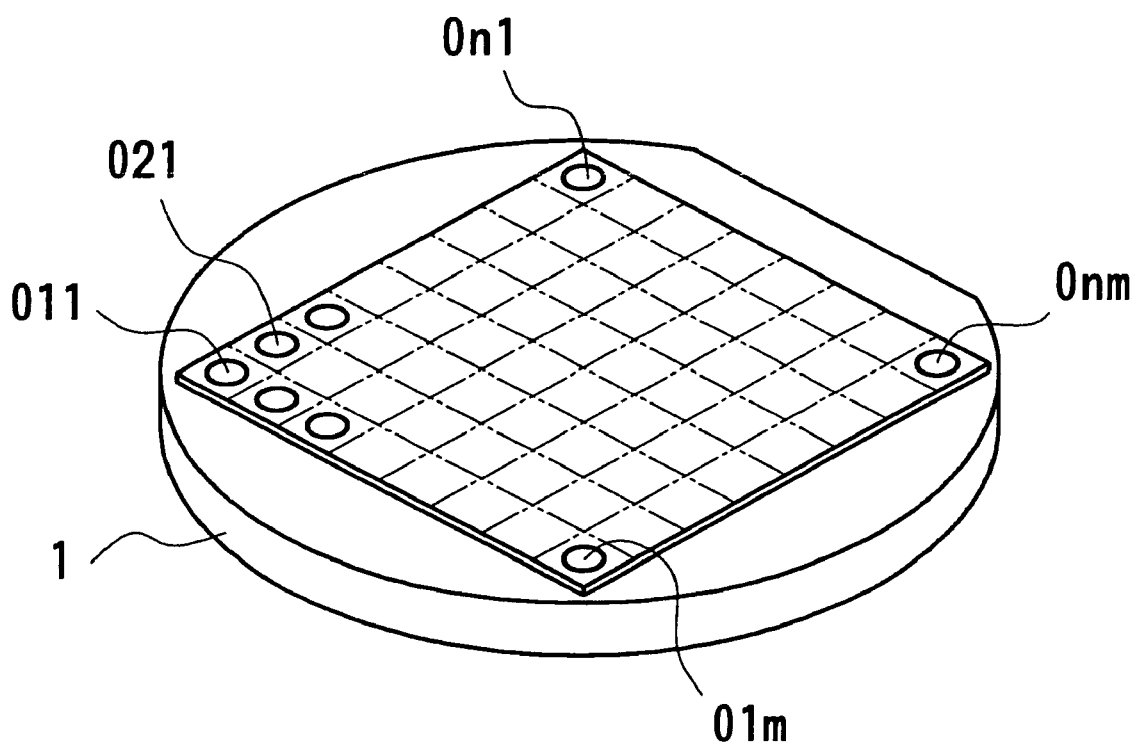
FIG. 1 is a perspective view showing an embodiment of the thin film magnetic head assembly according to the invention.

FIG. 1 is a perspective view showing the wafer type thin film magnetic head assembly according to the invention. The wafer type thin film magnetic head assembly shown in the drawing includes a number of thin film magnetic head elements Q11–Qnm formed on a wafer substrate 1 having a substantially circular shape. The wafer substrate 1 is made of a well known ceramic material. Typically, AlTiC ceramic material may be used. The thin film magnetic head elements Q11–Qnm are arranged in matrix of n rows and m columns.

Figure 2:
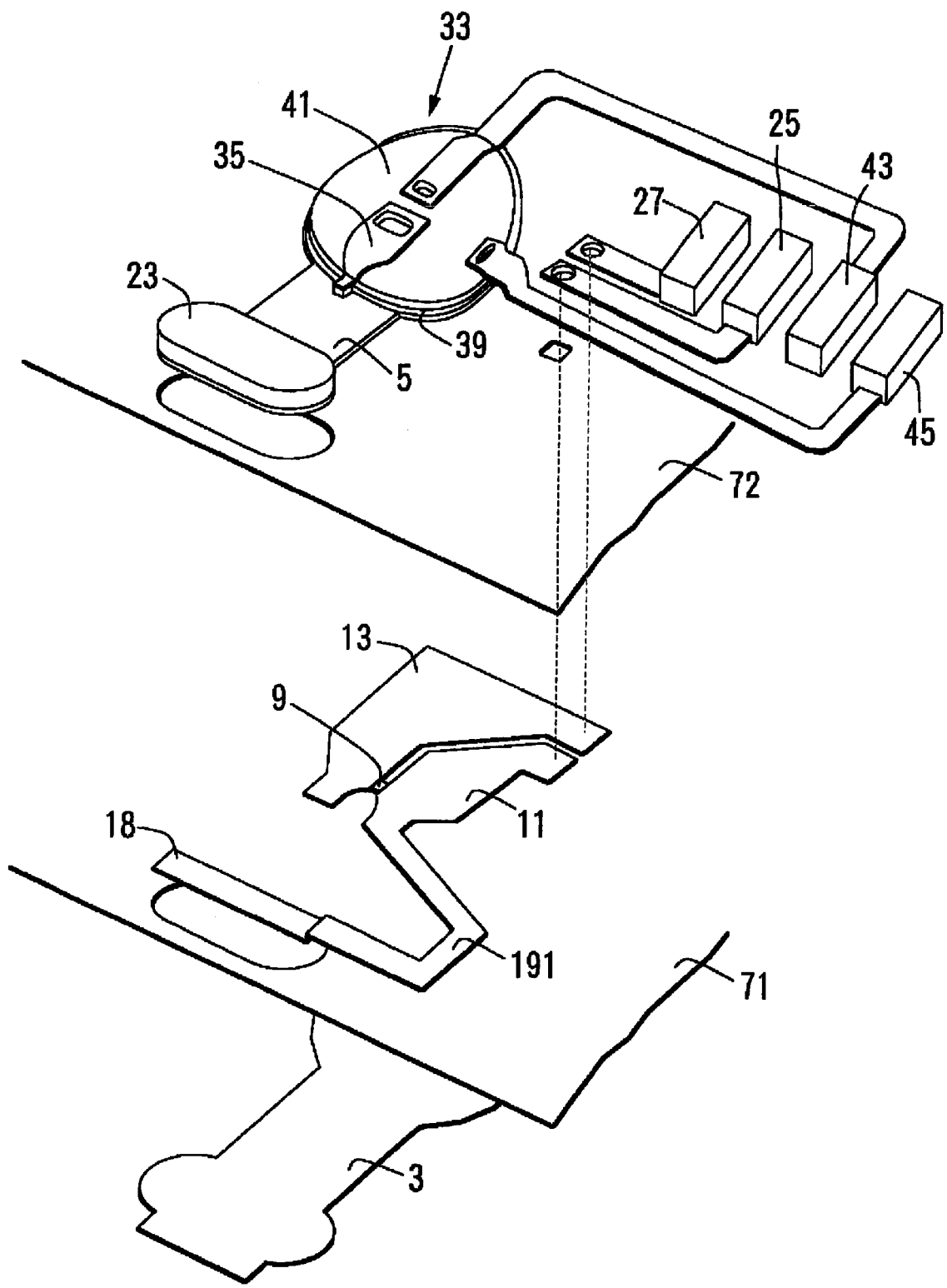
FIG. 2 is an exploded perspective view illustrating an embodiment of a thin film magnetic head element provided in the thin film magnetic head assembly according to the invention.
Figure 3:
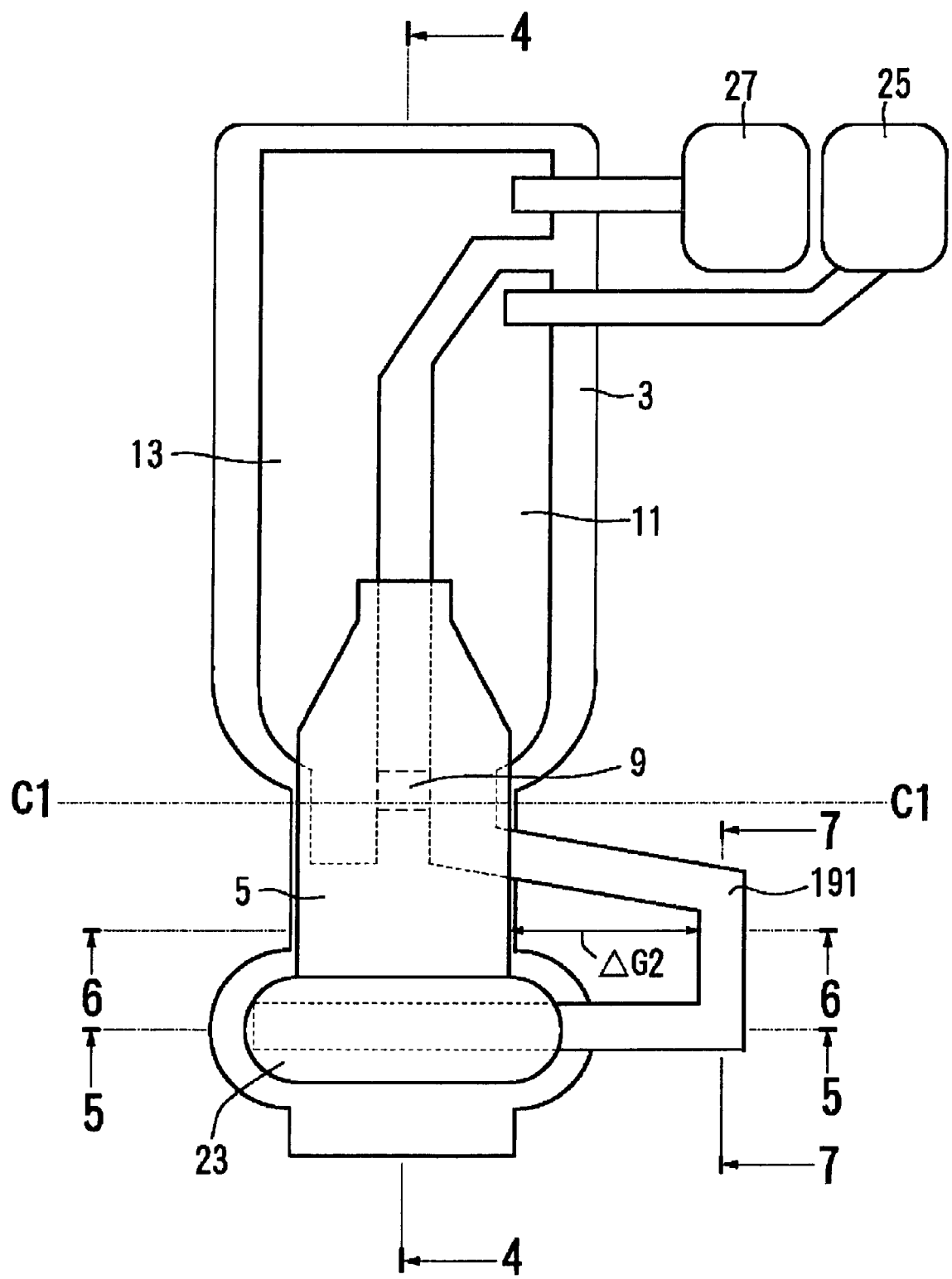
FIG. 3 is a plan view depicting a conductive member while an inductive type magnetic converting element is removed from thin film magnetic head element shown in FIG. 1.
Figure 4:
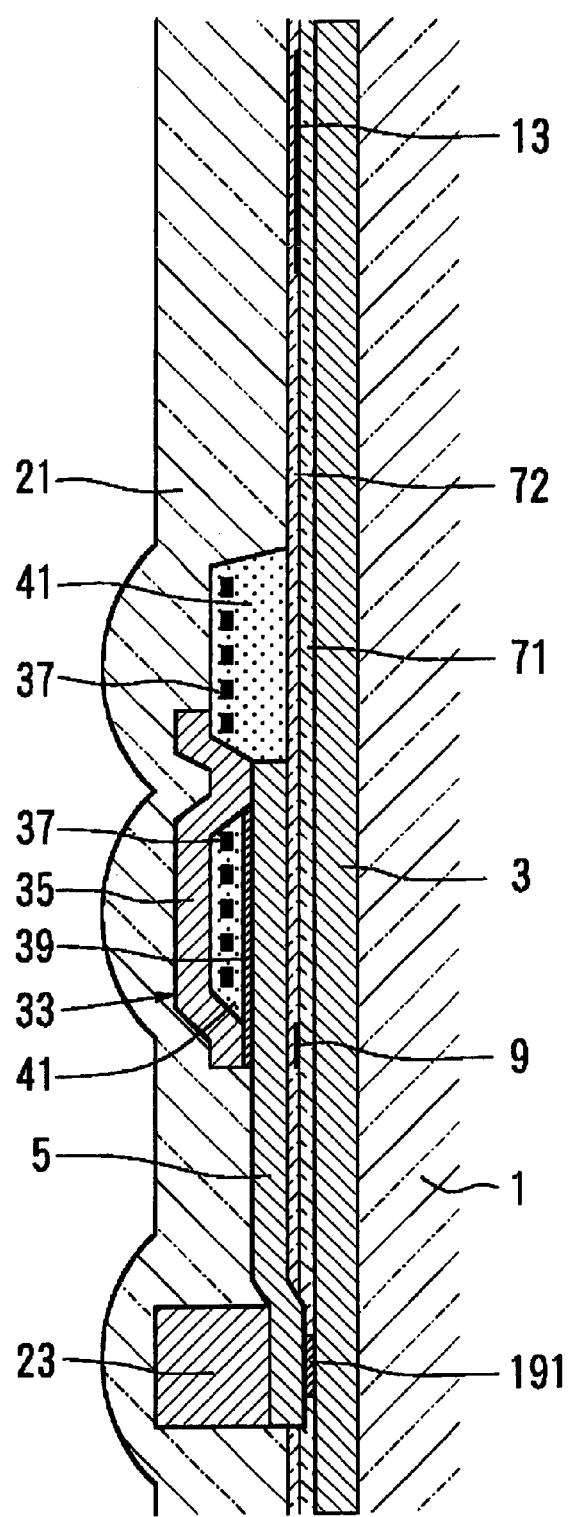
FIGS. 4, 5, 6 and 7 are cross sectional views cut along lines 4—4, 5—5, 6—6 and 7—7, respectively in FIG. 3.
Figure 5:
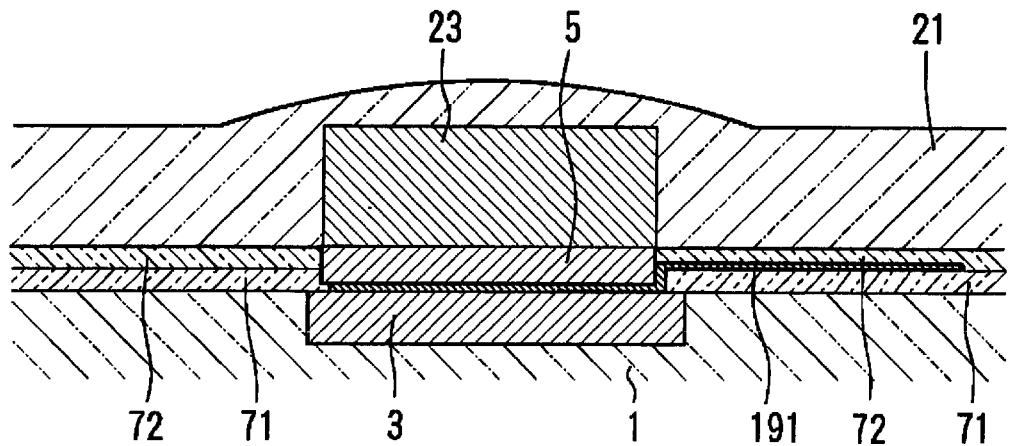
Figure 6:
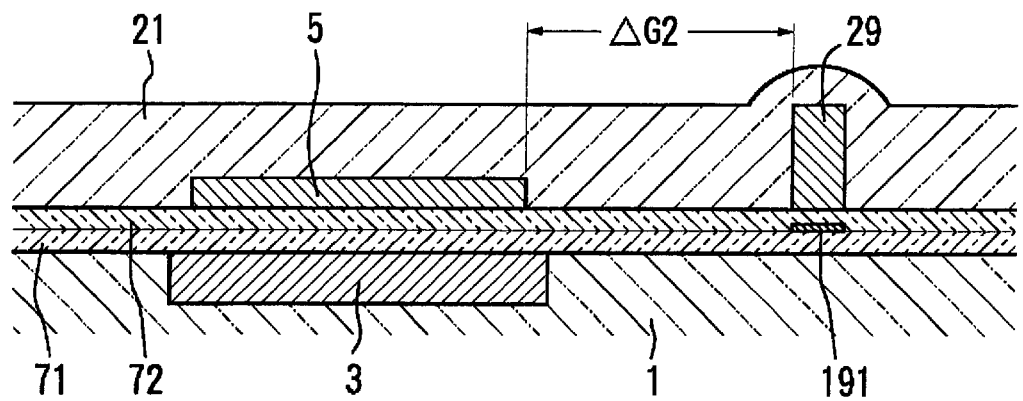
Figure 7:
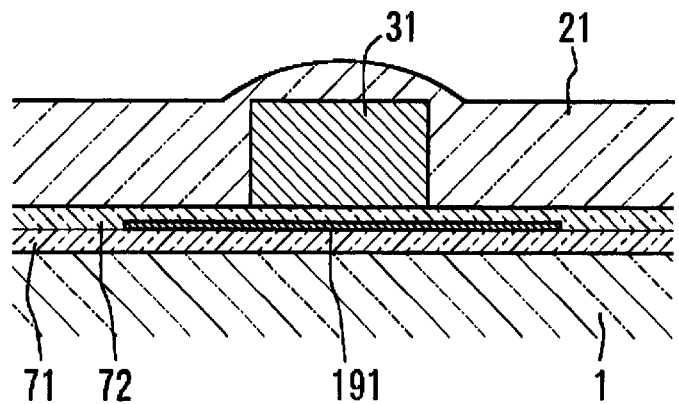

FIG. 2 is an exploded perspective view illustrating one of the thin film magnetic head elements Q11–Qnm, FIG. 3 is a plan view depicting an electrically conductive member of the thin film magnetic head element shown in FIG. 2 from which an inductive type thin film magnetic head element is removed, FIG. 4 is a cross sectional view cut along a line 4—4 in FIG. 3, FIG. 5 is a cross sectional view cut along a line 5—5 in FIG. 3, FIG. 6 is a cross sectional view cut along a line 6—6 in FIG. 3, and FIG. 7 is a cross sectional view cut along a line 7—7 in FIG. 3. As shown in these drawings, each of the thin film magnetic head elements Q11–Qnm comprises a first shield film 3, a first insulating film a magnetoresistive element 9, a second electrode film 13, a first electrode film 11, a second shield film 5, a second insulating film 72 and a conductive film 191.

The first shield film 3 is stacked on the wafer substrate 1, and the first insulating film 71 is stacked on the first shield film 3. The first shield film 3 may be formed by a permalloy film.

The magnetoresistive element 9 is formed on the first insulating film 71. The magnetoresistive element 9 may be formed by a magnetic anisotropic magnetoresistive film, a spin valve film or a giant magnetoresistive (GMR) film using a perovskite type magnetic material or ferromagnetic tunnel junction.

The first and second electrode films 11 and 13 are provided on the first insulating film 71 and have one ends connected to respective ends of the magnetoresistive element 9, the other ends of the electrode films being extended toward an externally connecting section to be explained later. The externally connecting section situates remote from an air bearing surface of a finally completed thin film magnetic head.

The second shield film 5 is provided on the second insulating film 72. The second shield film 5 may be formed by a single or plural magnetic layers including a permalloy film.

The conductive film 191 is provided on the first insulating film 71 and is electrically connected to the first electrode film 11 as well as to the first and second shield films 3 and 5. The conductive film 191 is not always necessary to be made of a same material as the first electrode film 11. In the embodiment shown in the drawings, the conductive film 191 extends forwardly opposite to the externally connecting section with respect to the magnetoresistive element 9, and is electrically connected to the first and second shield films 3 and 5. The conductive film 191 is extended such that a middle portion of the conductive film is separated from at least the second shield film 5 among the first and second shield films 3 and 5 by a distance ΔG2 (see FIG. 3).

In the present embodiment, each of the thin film magnetic head elements Q11–Qnm further comprises an inductive type thin film magnetic head element 33 which serves as a writing element. This inductive type thin film magnetic head element 33 has a well known structure. Typically, the inductive type thin film magnetic head includes a first magnetic film constituted by the second shield film 5, a second magnetic film 35 which constitutes a magnetic circuit together with the first magnetic film, a coil film 37, a gap film 39 and an insulating film 41 (refer to FIGS. 2 and 4). Front ends of the first and second magnetic films 5 and 35 form pole portions which are faced to each other via the gap film 39 having a minute thickness. The first magnetic film may be formed to be separated from the second shield film 5.

Yoke portions of the first and second magnetic films 5 and 35 are coupled with each other at a back gap portion remote from the pole portion to constitute a magnetic circuit. The thin film coil 37 is provided on the insulating film 41 and is wound around the coupled portion of the yoke portions (FIG. 4). Respective ends of the thin film coil 37 are connected to terminal conductors 43 and 45, respectively. These terminal conductors 43 and 45 are covered with a third insulating film 21.

As stated above, in each of the thin film magnetic head elements Q11–Qnm provided on the wafer substrate 1, the first insulating film 71 is provided on the first shield film 3, and the magnetoresistive element 9 and first and second electrode films 11 and 13 are provided on the first insulating film 71. Therefore, the magnetoresistive element 9 and first and second electrode films 11 and 13 can be effectively shielded by the first shield film 3.

The second insulating film 72 covers the first and second electrode films 11 and 13 and magnetoresistive element 9, and the second shield film 5 is provided on the second insulating film 72. Therefore, the magnetoresistive element 9 and first and second electrode films 11 and 13 can be effectively shielded also by the second shield film 3.

Furthermore, the conductive film 191 is connected to the first electrode film 11 as well as to the first and second shield films 3 and 5. Therefore, the first electrode film 11 is kept equipotential with the first and second shield films 3 and 5. Since the second electrode film 13 becomes equipotential with the first electrode film 11 by means of the magnetoresistive element 9, the second electrode film 13 becomes also equipotential with the first and second shield films 3 and 5. Then, during the wafer process, no voltage is applied across the first and second insulating films 71 and 72 provided between the first and second electrode films 11 and 1 3 and the fist and second shield films 3 and 5, and thus the first and second insulating films 71 and 72 can be prevented from being damaged or broken due to electrostatic charge. According to the invention, the first and second electrode films 11 and 13 may be connected to any one of the first and second shield films 3 and 5. Also in such a structure, the above explained merit can be equally attained as long as the first and second shield films 3 and 5 are electrically conducting.

As stated above, the first electrode 11 is electrically connected to the first and second shield films 3 and 5 via the conductive film 191. Therefore, by cutting the conductive film 191, the first and second electrode films 11 and 13 can be electrically separated from the first and second shield films 3 and 5. The cutting operation may be carried out on the wafer.

In the present embodiment, the middle portion of the conductive film 191 is separated from a side edge of the second shield film 5 by a distance ΔG2. In this structure, upon separating the first electrode film 11 from the first shield film by cutting the conductive film 191; the cutting operation can be performed at an area outside at least the second shield film 5, and thus a generation of conductive material debris which might be generated in the known method upon cutting the second shield film 5 can be avoided. Therefore, the first electrode film 11 can be prevented from being short-circuited to the second shield film 5 due adhesion of a conductive material debris onto a cut surface of the first electrode film. This will be explained later further in detail.

After separating electrically the first electrode film 11 from the first and second shield films 3 and 5, it is possible to measure an insulating property of the first and second insulating films 71 and 72 between the first and second electrode films 11, 13 and the first and second shield films 3, 5. According to the invention, this measurement of the insulating property can be conducted on the wafer.

In the present embodiment, each of the thin film magnetic head elements Q11—Qnm provided on the wafer comprises the third insulating film 21, first terminal conductor 23, second terminal conductor 25 and third terminal conductor 27. The third insulating film 21 constituting an outermost layer may be made of, for instance alumina and is generally called a protection film.

The first terminal conductor 2 is formed on the second shield film 5 and is covered with the third insulating film 21. The second terminal conductor 25 is electrically connected to the fist electrode film 11 and is covered with the third insulating film 21. The third terminal conductor 27 is electrically connected to the second electrode film 13 and is covered with the third insulating film 21. A function of the first terminal conductor 23 will be explained later.

In this embodiment, each of the thin film magnetic head elements Q11–Qnm provided on the wafer further includes a metal film 29 (FIG. 6) which is provided on the first insulating film 71 at a portion corresponding to the middle portion of the conductive film 191 of the first electrode film 11 and is covered with the third insulating film 21. The terminal conductors 43 and 45 of the inductive type thin film magnetic head element 33 (refer to FIG. 2) are also covered with the third insulating film 21. A function of the metal film 29 will be also explained later in detail.

Figure 8:
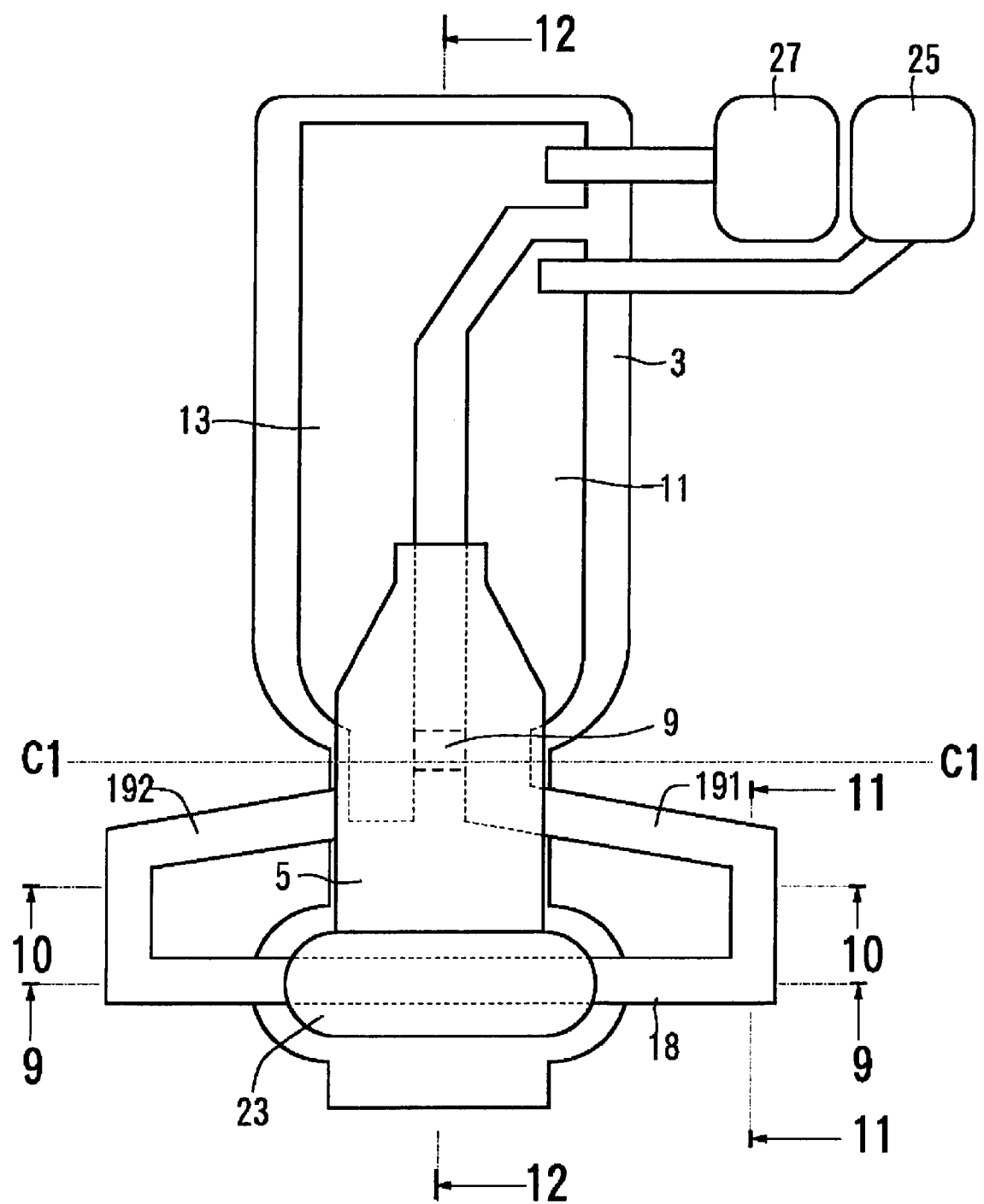
FIG. 8 is a plan view depicting a conductive member of another embodiment of the thin film magnetic head assembly according to the invention, while an inductive type magnetic converting element is removed.
Figure 9:
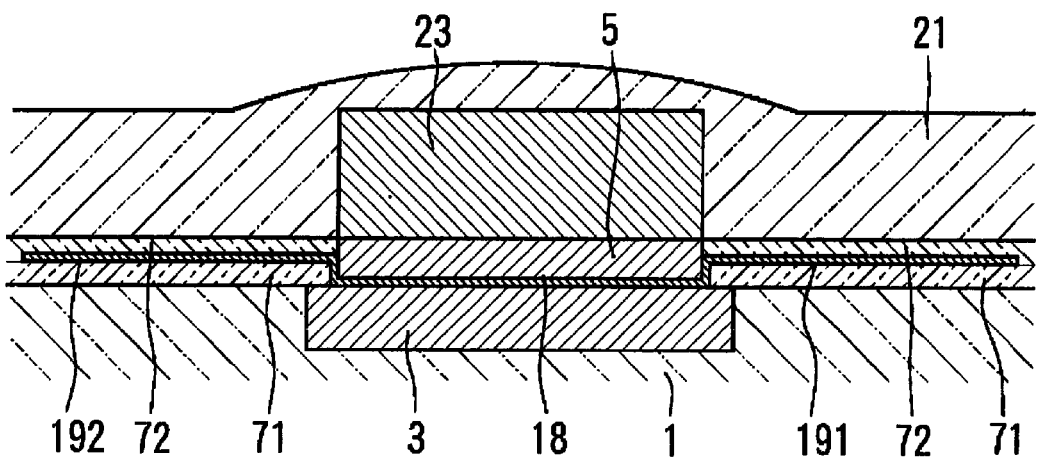
FIGS. 9, 10, 11 and 12 are cross sectional views cut along lines 9—9, 10—10, 11—11 and 12—12, respectively in FIG. 8.
Figure 10:
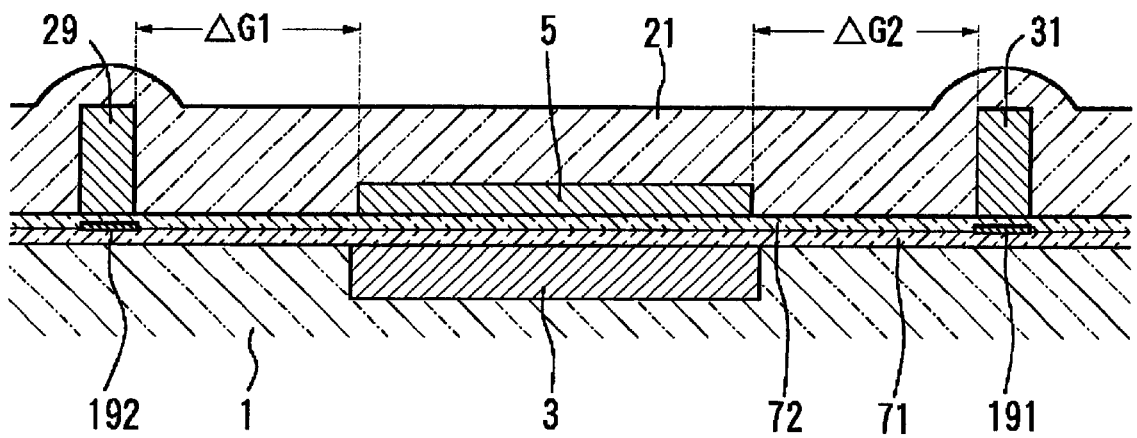
Figure 11:
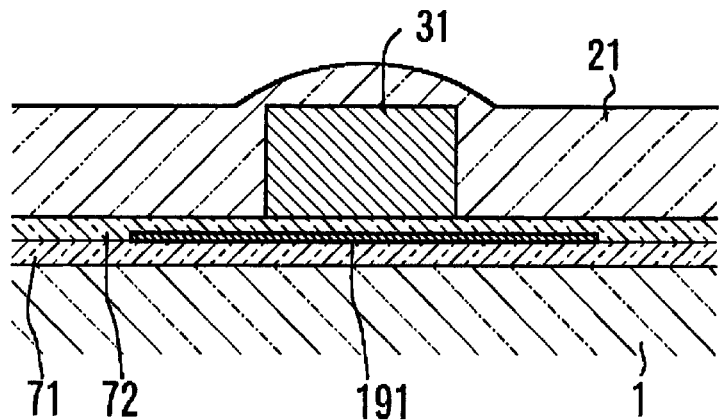

FIG. 8 shows another embodiment of the thin film magnetic head assembly according to the invention, FIG. 9 is a cross sectional view cut along a line 9—9 in FIG. 8, FIG. 10 is a cross sectional view cut along a line 10—10 in FIG. 8, and FIG. 11 is a cross sectional view cut along a line 11—11 in FIG. 8. In these figures, portions similar to those shown in FIGS. 1–7 are denoted by the same reference numerals used in FIGS. 1–7. In the present embodiment, two conductive films 191 and 192 are provided to be electrically connected to the first and second electrode films 11 and 13, respectively, and these conductive films are mutually connected by a bridge portion 18 which is electrically connected to the first and second shield films 3 and 5. The first terminal conductor 23 is provided on the second shield film 5 above the bridge portion 18. In the present embodiment, middle portions of the first and second conductive films 191 and 192 are formed to be separated from opposing side edges of the first and second shield films 3 and 5 by distances ΔG1 and ΔG2, respectively (refer to FIG. 10).

In the embodiment illustrated in FIGS. 8–11, in addition to the same functional advantage as the first embodiment shown in FIGS. 1–7 can be attained, there can be obtained another merit that the magnetoresistive element 9 can be further effectively protected because the magnetoresistive element is short-circuited by means of the first and second electrode films 11, 13, first and second conductive films 191, 192 and bridge portion 18.

Now a method of manufacturing the magnetic head wafer shown in FIGS. 8–11 will be explained concretely with reference to FIGS. 12–22. It should be noted that this manufacturing method may be applied to the magnetic head wafer illustrated in FIGS. 1–7, but its detailed explanation is dispensed with.

Figure 12:
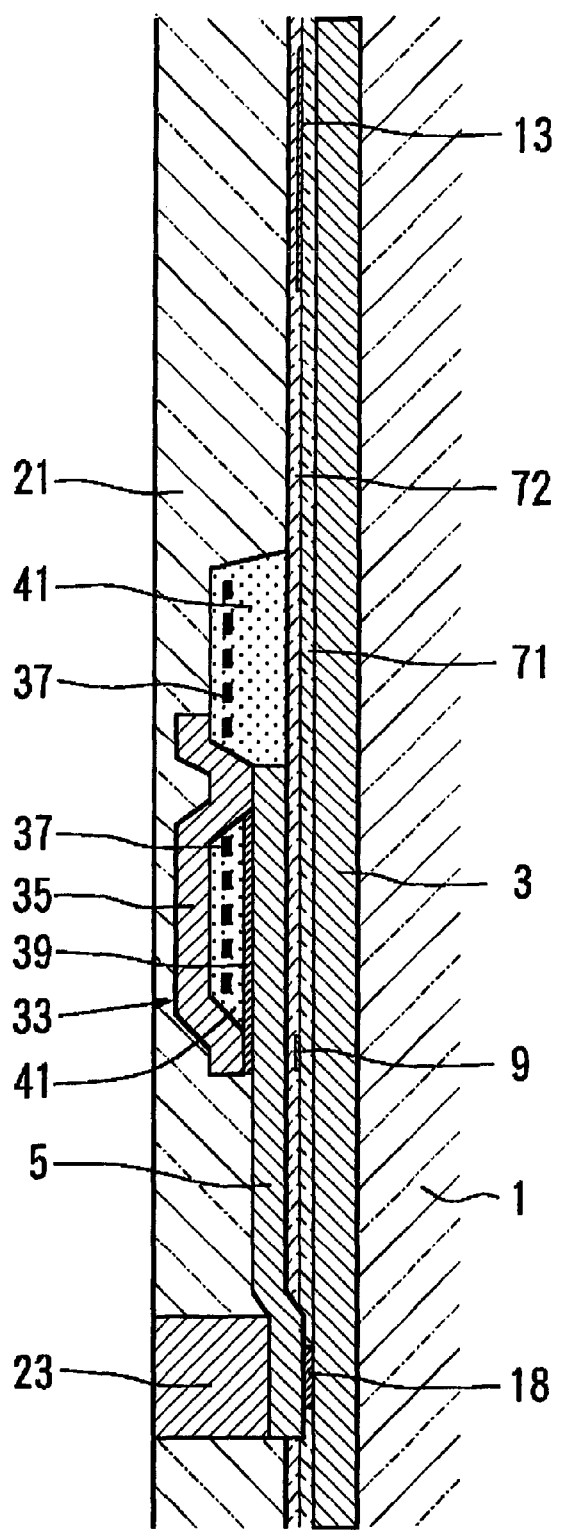
Figure 13:
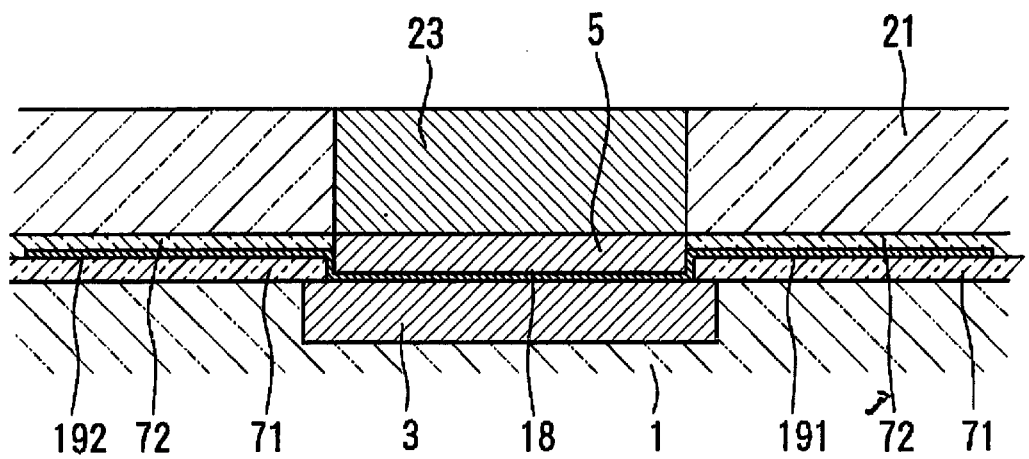
FIGS. 13, 14 and 15 are cross sectional views depicting steps after the steps of FIGS. 9, 10 and 11, respectively.
Figure 14:
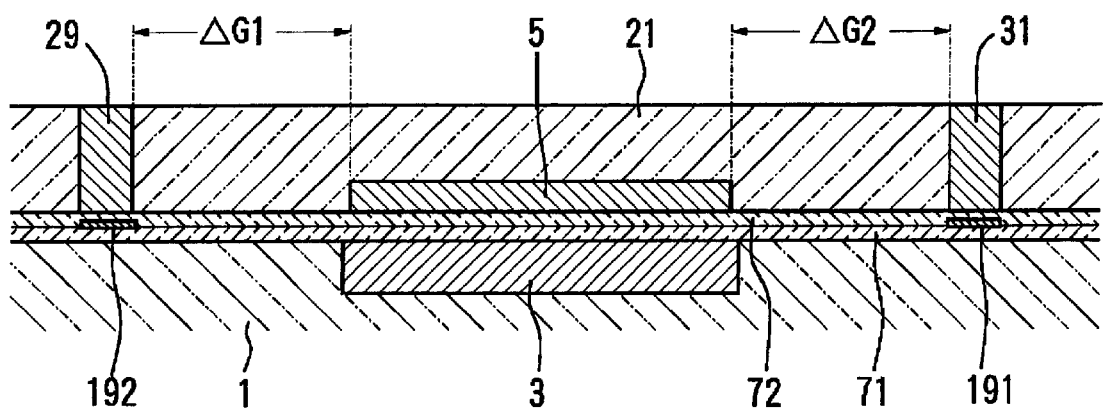
Figure 15:
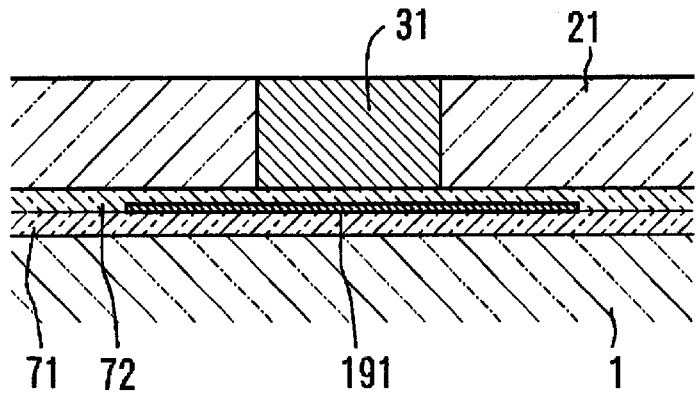

At first, FIGS. 12–15 will be explained. FIG. 12 is a cross sectional view cut along a line 12—12 in FIG. 8, FIG. 13 is a cross sectional view (cut along a line 9—9 in FIG. 8) corresponding to FIG. 9, FIG. 14 is a cross sectional view (cut along a line 10—10 in FIG. 8) corresponding to FIG. 10, and FIG. 15 is a cross sectional view (cut along a line 11—11 in FIG. 8) corresponding to FIG. 11. As shown in the drawings, a surface of the third insulating film 21 is polished to expose end surfaces of the first and second metal films 29 and 31 together with end surfaces of the first, second and third terminal conductors 23, 25 and 27. Although not shown in the drawings, end surfaces of the terminal conductors 43 and 45 (see FIG. 2) of the inductive type thin film magnetic head element 33 are also exposed in the surface of the third insulating film 21. Then, the first to third terminal conductors 23–27 may be utilized as terminals for measuring the insulating property on the wafer.

Figure 16:
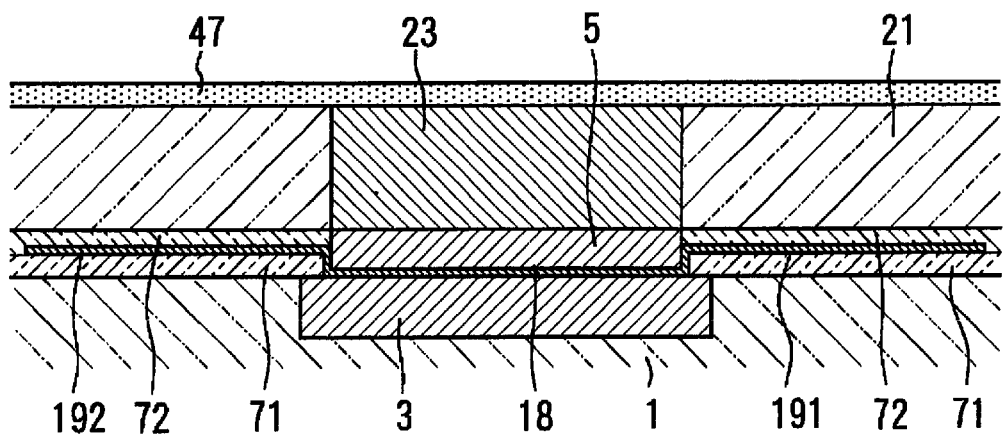
FIGS. 16, 17 and 18 are cross sectional views showing steps after the steps of FIGS. 12–15.
Figure 17:
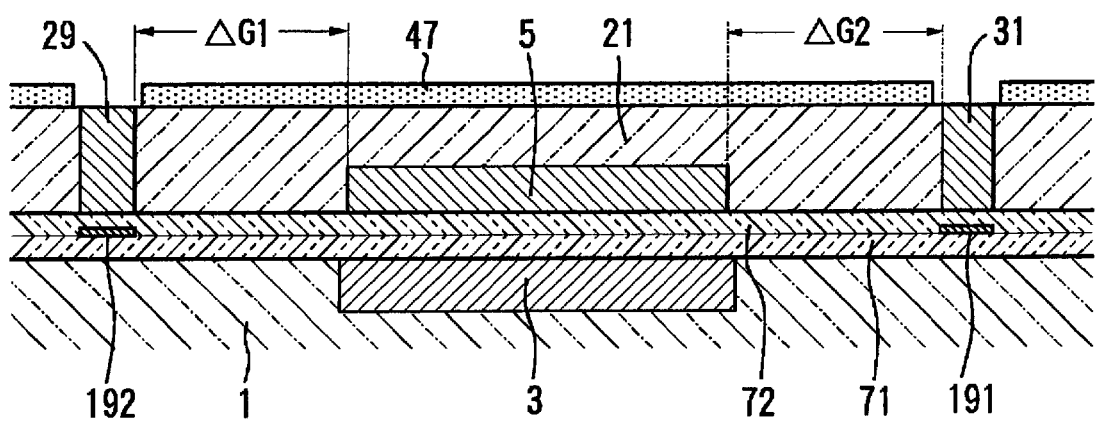
Figure 18:
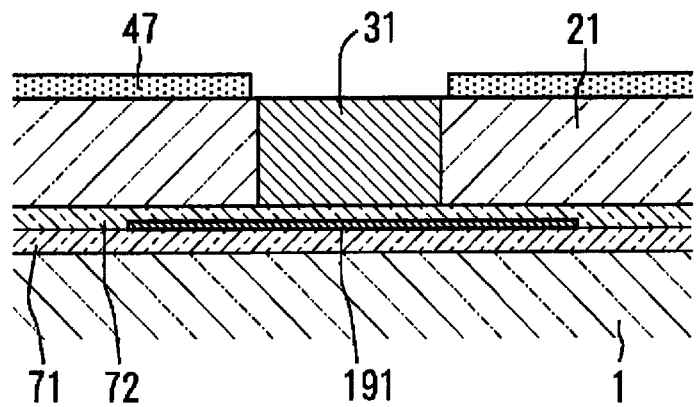
Figure 19:
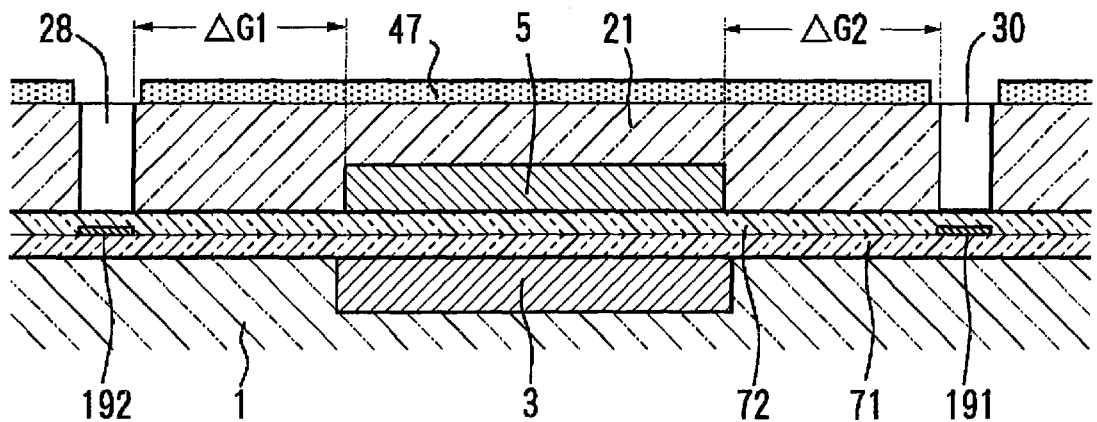
FIGS. 19 and 20 are cross sectional views representing steps after the steps of FIGS. 16–18.
Figure 20:
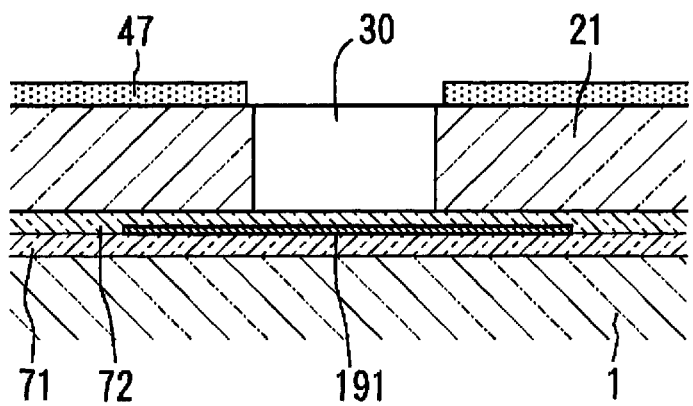

Next, a photoresist film is applied on the third insulating film 21, and photolithography process is carried out for the photoresist film to form a necessary pattern by exposure and development. FIGS. 16–18 show photoresist patterns after development.

At first, as shown in FIG. 16, a photoresist film 47 is shaped into such a pattern that the first terminal conductor 23 is covered with the photoresist film. Although not shown in the drawings, the second and third terminal conductors 25 and 27 and terminal conductors 43, 45 of the inductive type thin film magnetic head element 33 are also covered with the photoresist film 47. However, as illustrated in FIGS. 17 and 18, end surfaces of the first and second metal films 29 and 31 are exposed in the photoresist film 47.

Next, the first and second metal films 29 and 31 are removed by selective etching. Then, there are obtained holes 28 and 30 from which the metal films 29 and 31 have been removed.

Figure 21:
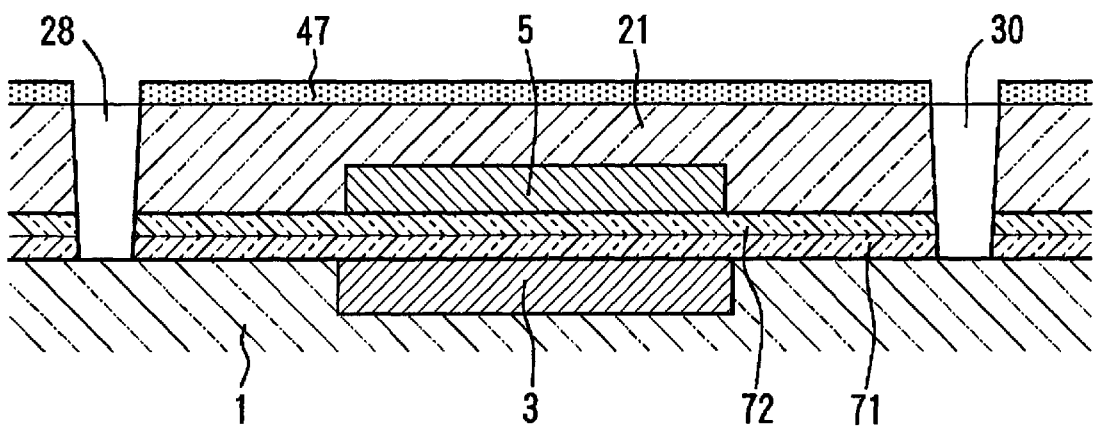
FIGS. 21 and 22 are cross sectional views showing steps after the steps shown in FIGS. 19 and 20.
Figure 22:
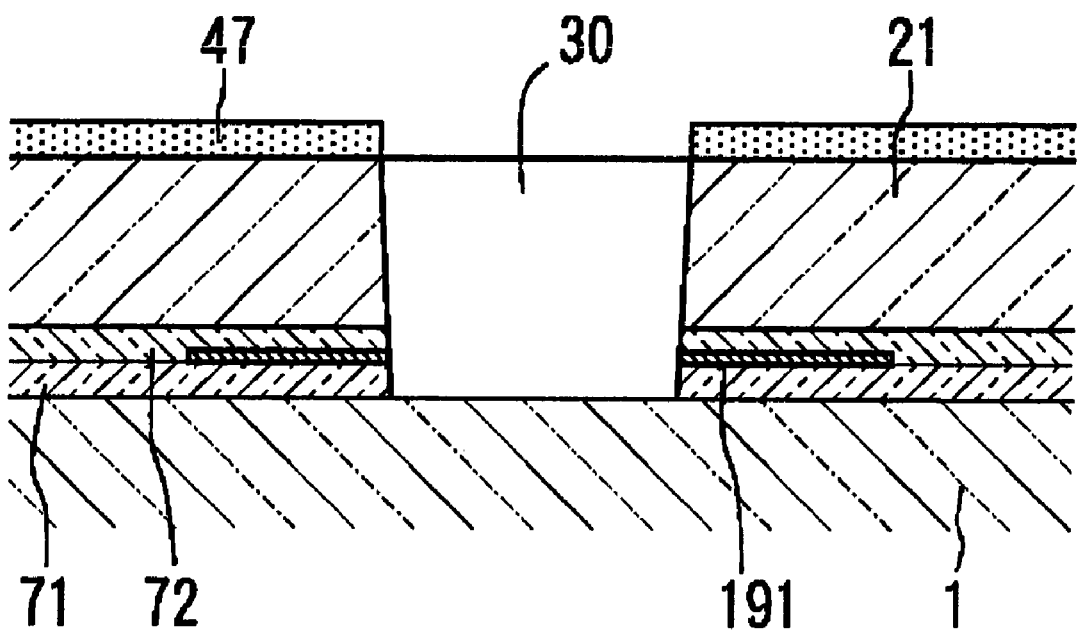
Figure 23:
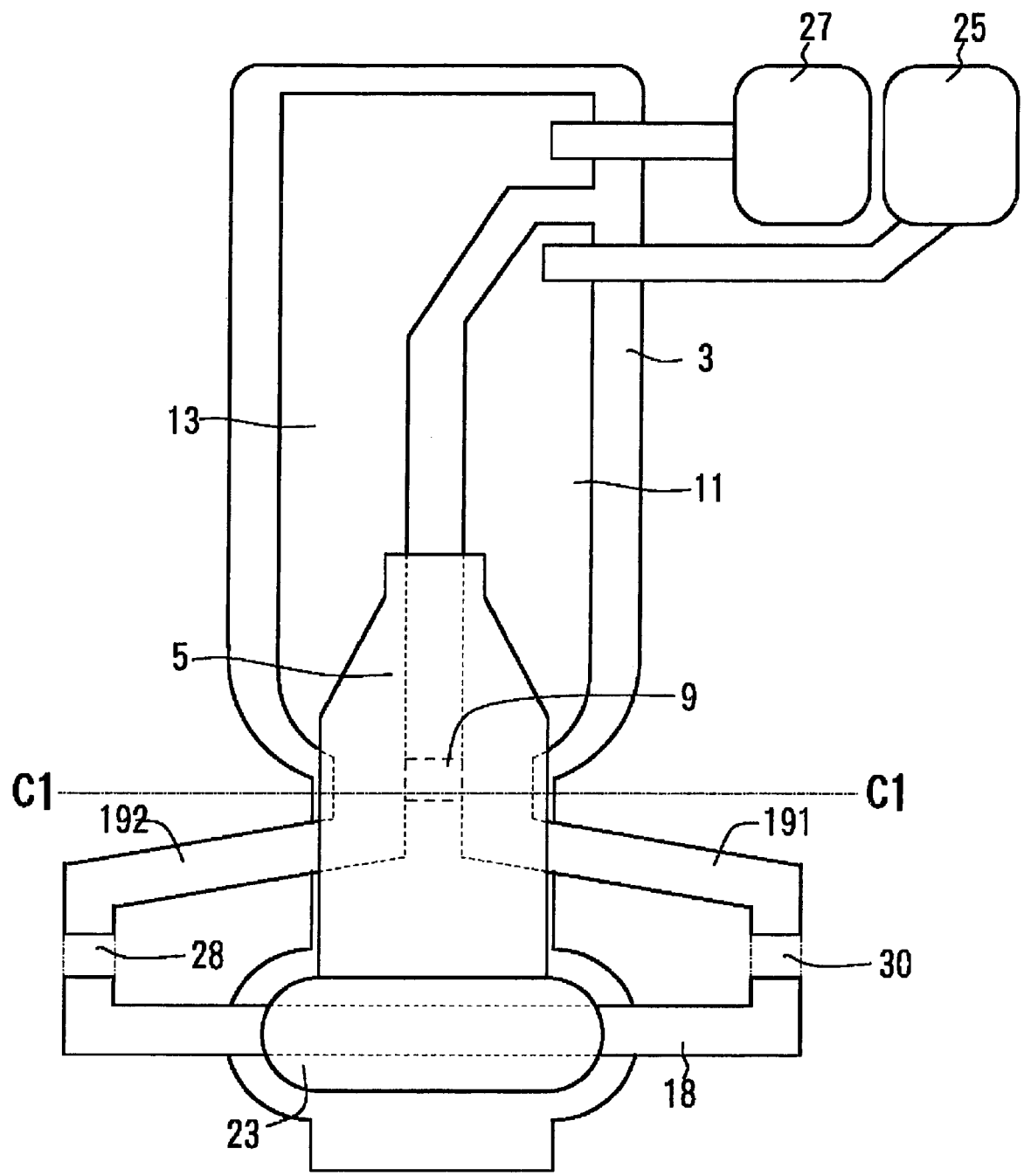
FIG. 23 is a plan view illustrating the conductive member obtained by the steps shown in FIGS. 21 and 22.

Next, as depicted in FIGS. 21 and 22, the conductive films 191 and 192 are cut through the holes 28 and 30. In this case, the holes 28 and 30 may be expressed as first and second cutting sites 28 and 30. This cutting may be performed by a dry etching such as ion milling or a wet etching. FIG. 23 shows a condition at which the cutting operation has been completed. The conductive films 191 and 192 are cut at the first and second cutting sites 28 and 30 over suitable lengths.

As explained before, in the present embodiment, the middle portions of the conductive films 191 and 192 are separated from the side edges of the first and second shield films 3 and 5, respectively over the distances ΔG1 and ΔG2, respectively. Therefore, when the conductive films 191, 192 are cut, the cutting operation can be performed at an area outside the first and second shield films 3 and 5. Then, it is possible to avoid a generation of conductive material debris during the cutting operation, and thus the cut portions of the conductive films 191, 192 could not be short-circuited to the first and second shield films 3 and 5 by means of an adhesion of conductive material debris onto the cut surfaces.

By the cutting operation, the first and second electrode films 11 and 13 are separated from the first and second shield films 3 and 5, and therefore the insulating property of the first and second insulating films 71 and 72 can be measured on the wafer between the first terminal conductor 23 and the second terminal conductor 25 or third terminal conductor 27. In the present embodiment, since the end surfaces of the first, second and third terminal conductors 23, 25 and 27 are exposed in the third insulating film 21, the measurement of the insulating property can be conducted simultaneously for all a number of thin film magnetic head elements Q11–Qnm by contacting a probe array having a pattern corresponding to the first to third terminal conductors 23–27 with these terminal conductors.

Figure 24:
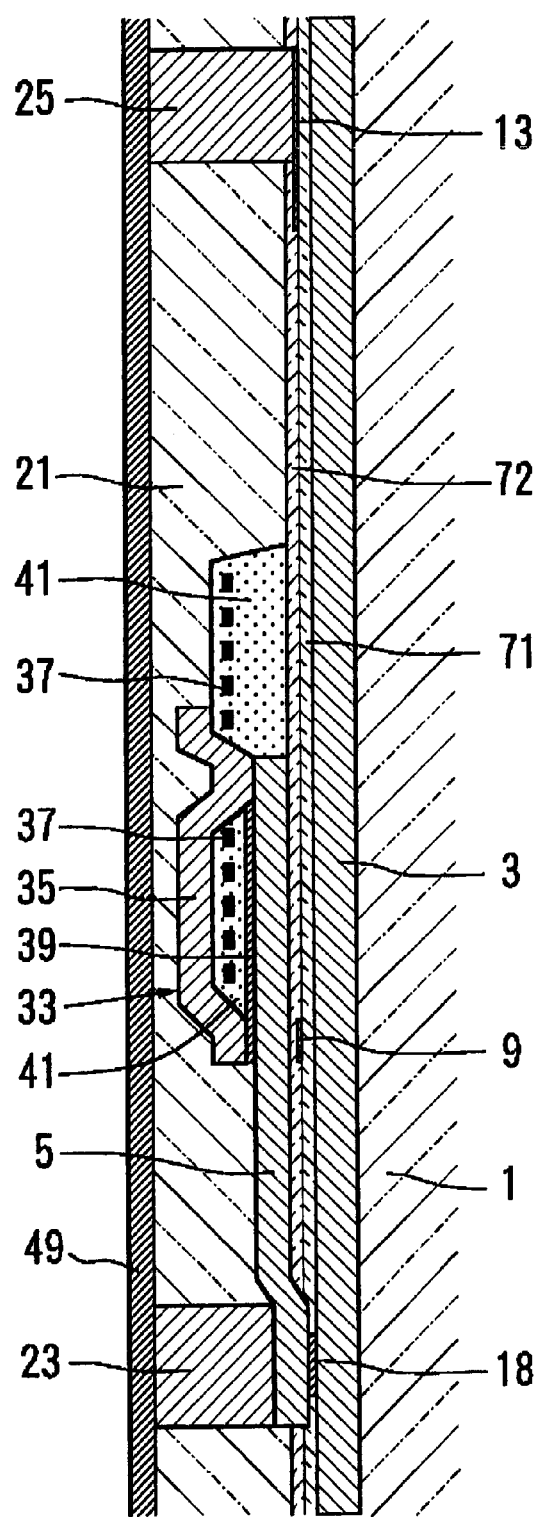
FIG. 24 is a cross sectional view showing another embodiment of the thin film magnetic head assembly according to the invention.

FIG. 24 shows another embodiment of the thin film magnetic head assembly according to the invention. In the present embodiment, after measuring the insulating property, an electrically conductive paste layer 49 is provided. The conductive paste layer 49 is provided on the surface of the third insulating film 21 as well as on the end surfaces of the first, second and third terminal conductors 23, 25 and 27, and therefore these terminal conductors 23, 25 and 27 are electrically connected to each other.

In the thin film magnetic head assembly having the structure explained above, the second and third terminal conductors 25, 27 electrically connected to the first and second electrode films 11 and 13 are electrically conducted to the first terminal conductor 23 electrically connected to the first and second shield films 3 and 5 by means of the conductive paste layer 49. Therefore, although the first and second cutting sites 28 and 30 are provided, the first and second electrode films 11 and 13 can be kept equipotential with the first and second shield films 3 and 5. Then, the first and second insulating films 71 and 72 can be effectively prevented from being damaged or broken during manufacturing steps following the insulating property measuring step.

In the embodiment illustrated in FIGS. 8–24, the conductive films 191 and 192 are extended forwardly with respect to the magnetoresistive element 9 and the first terminal conductor 23 is provided at the extended portion. Since a final thin film magnetic head is obtained by cutting along a cut-line C1 (refer to FIGS. 3, 8 and 23), the first terminal conductor 23, conductive films 191, 192 and bridge portion 18 are not remained in the completed thin film magnetic head.

Figure 25:
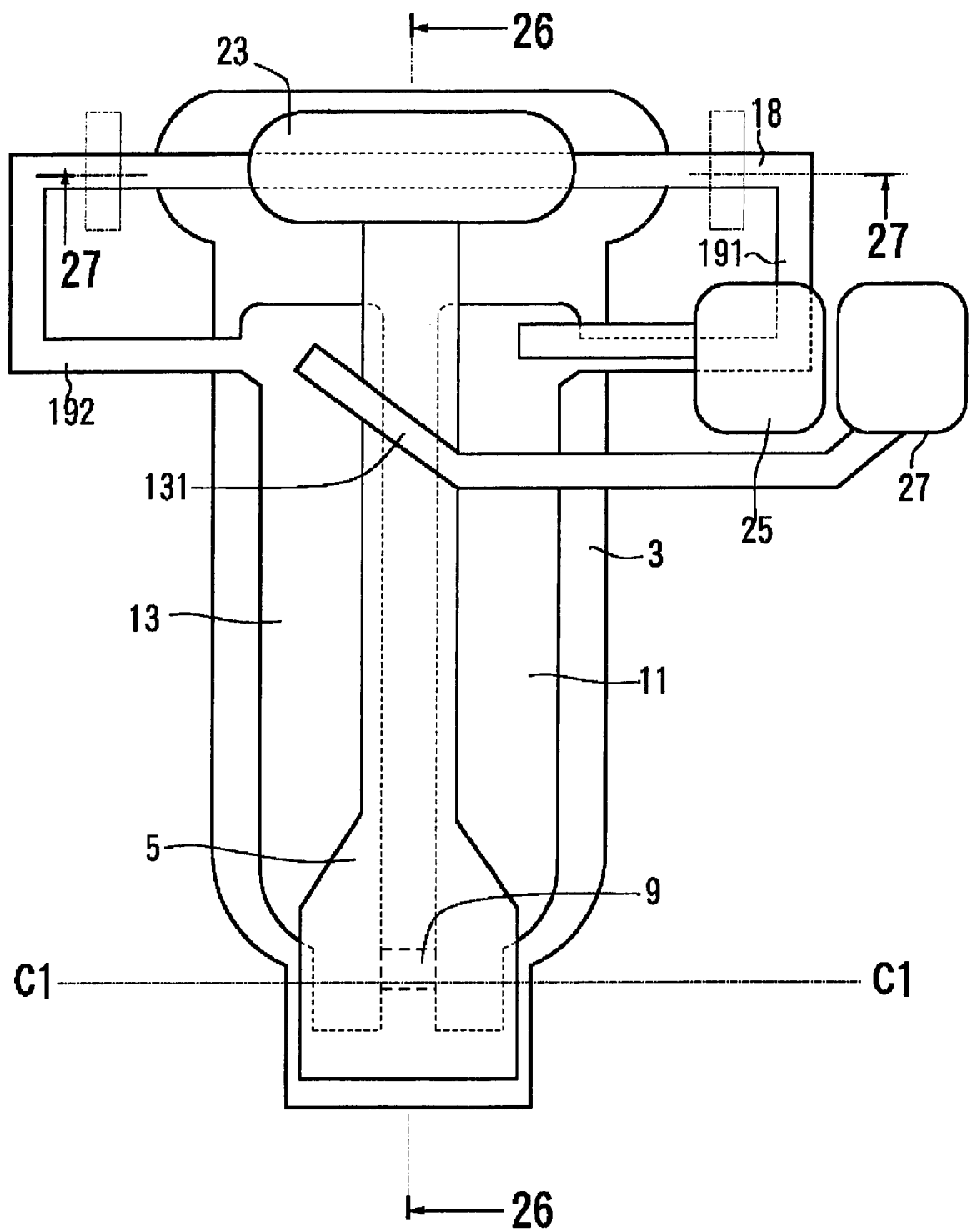
FIG. 25 is a plan view depicting a conductive member of the thin film magnetic head assembly, while the inductive type thin film magnetic head is removed.
Figure 26:
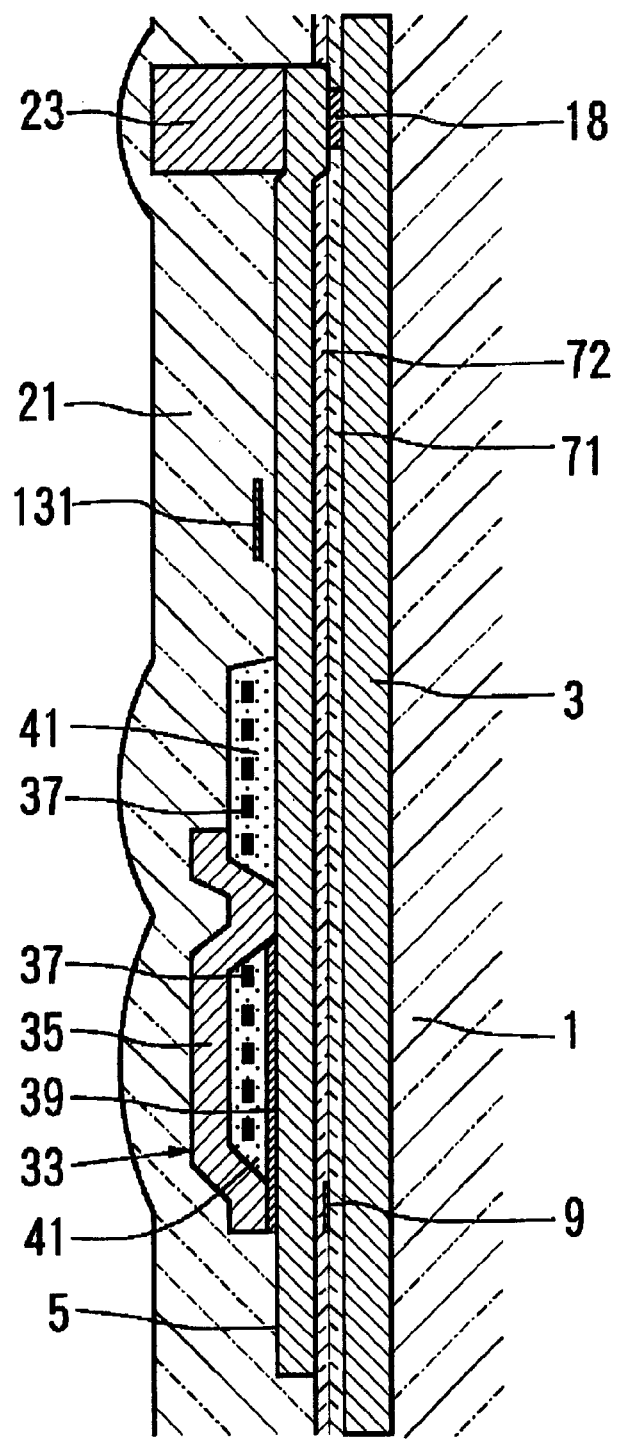
FIGS. 26 and 27 are cross sectional views cut along lines 26—26 and 27—27 in FIG. 25.
Figure 27:
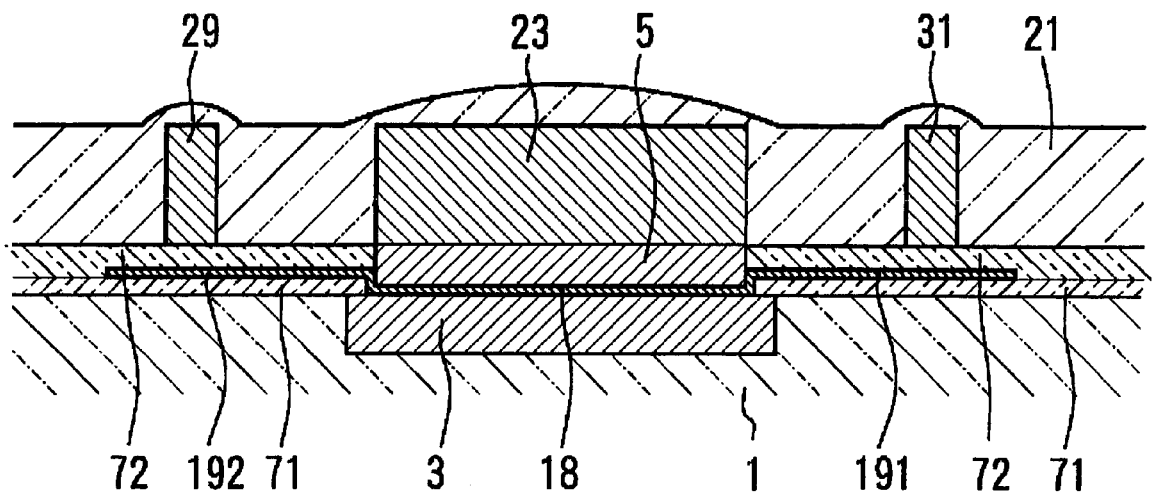

FIG. 25 is a plan view showing a conductive member of another embodiment of the thin film magnetic head assembly according to the invention, while the inductive type thin film magnetic head element is removed. FIG. 26 is a cross sectional view cut along a line 26—26 in FIG. 25, and FIG. 27 is a cross sectional view cut along a line 27—27 in FIG. 8. In these figures, portions similar to those of the previous embodiments are denoted by the same reference numerals used in the previous embodiments. In the present embodiment, the conductive films 191 and 192 electrically connected to the first and second electrode films 11 and 13, respectively extend backward with respect to the magnetoresistive element 9 and are mutually connected by a bridge portion 18. The first terminal conductor 23 is provided on the second shield film 5 behind the magnetoresistive element 9.

Also in the present embodiment of the thin film magnetic head assembly, the same functional advantage can be attained as the previous embodiments. Furthermore, after cutting along the cut-line C1, the first terminal conductor 23 situating behind the magnetoresistive element 9 is remained in the thin film magnetic head. Therefore, as compared with the previous embodiments, the insulating property between the first and second shield films 3, 5 and the first and second electrode films 11, 13 can be measured in the completed thin film magnetic head.

Figure 28:
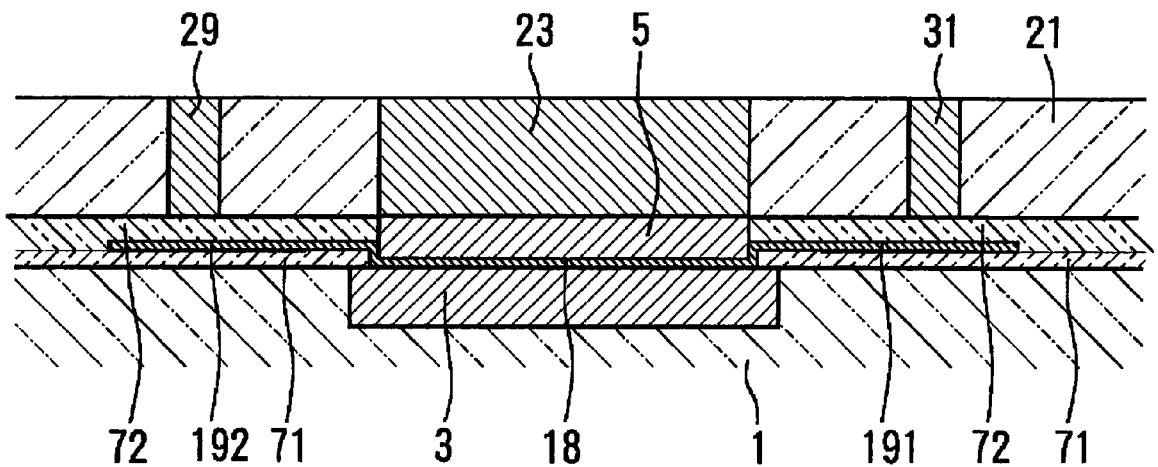
FIGS. 28–32 are cross sectional views showing successive steps of the method of manufacturing the magnetic head wafer shown in FIGS. 25–27.

Now a method of manufacturing the magnetic wafer shown in FIGS. 25–27 will be explained with reference to FIGS. 28–32. At first, as illustrated in FIG. 28, the surface of the third insulating film 21 is polished to expose the end surfaces of the first, second and third terminal conductors 23, 25 and 27 (refer to FIG. 25) together with end surfaces of the first and second metal films 29 and 31. Although not shown in the drawings, end surfaces of the terminal conductors 43 and 45 (refer to FIG. 2) of the inductive type thin film magnetic head element 33 are exposed in the third insulating film 21. Then, the first to third terminal conductors 23–27 may be used as connecting terminals in measuring the insulating property.

Next, a photoresist film is applied on the third insulating film 21, and photolithography process is carried out for the photoresist film to form a necessary pattern by exposure and development.

Figure 29:
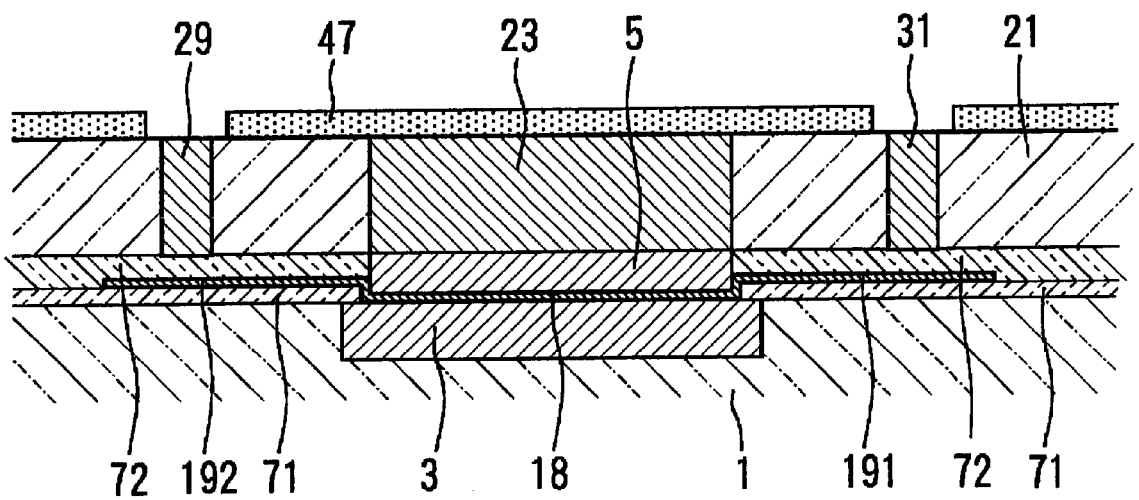

FIG. 29 shows photoresist patterns after development. As shown in the drawing, the photoresist film 47 is shaped into such a pattern that the end surfaces of the first metal films 29 and 31 are exposed. Although not shown in the drawings, the photoresist film 47 is formed to cover the first, second and third terminal conductors 23, 25 and 27 as well as the terminal conductors 43, 45 of the inductive type thin film magnetic head element 33.

Figure 30:
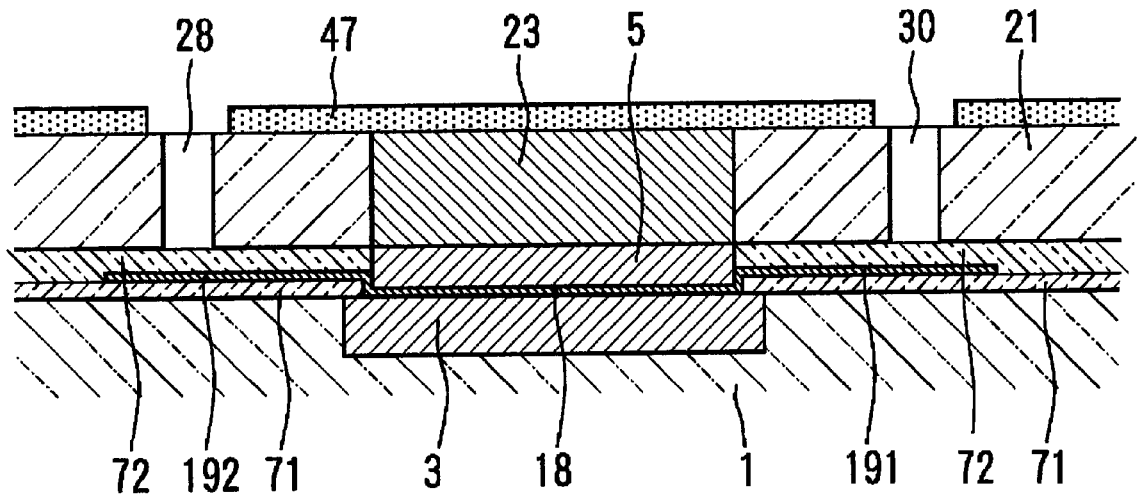

Next, as depicted in FIG. 30, the first and second metal films 29 and 31 are removed by selective etching. Then, there are obtained holes 28 and 30 from which the metal films 29 and 31 have been removed.

Figure 31:
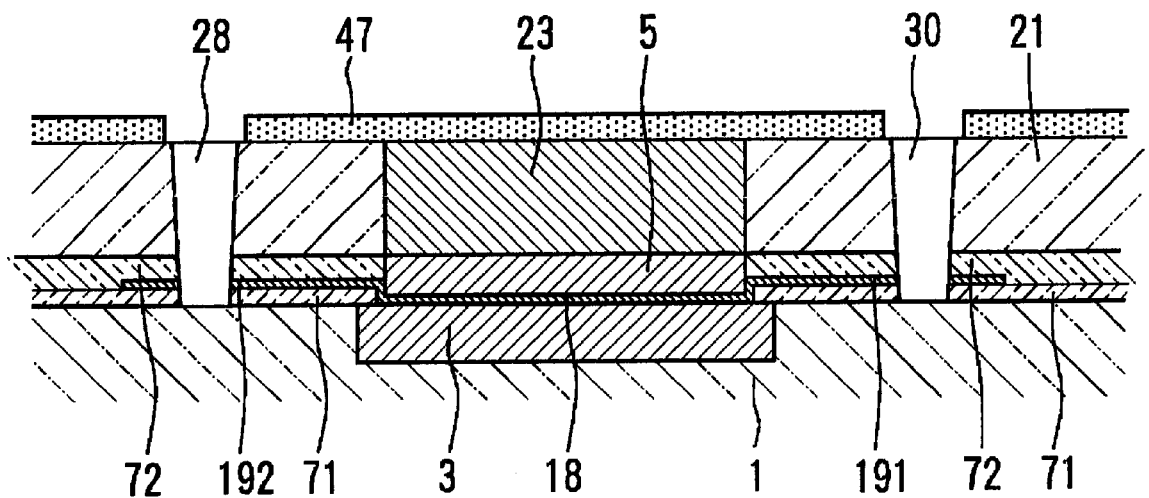
Figure 32:
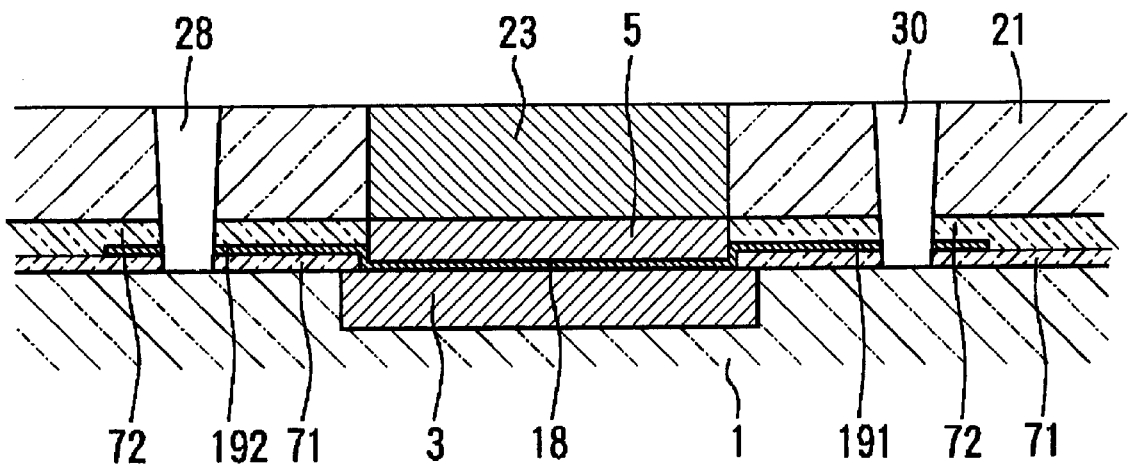

Next, as illustrated in FIG. 31, the conductive films 191 and 192 are cut through the holes 28 and 30. The cutting may be performed by a dry etching such as ion milling or a wet etching. Next, as shown in FIG. 32, the photoresist film 47 is removed.

Figure 33:
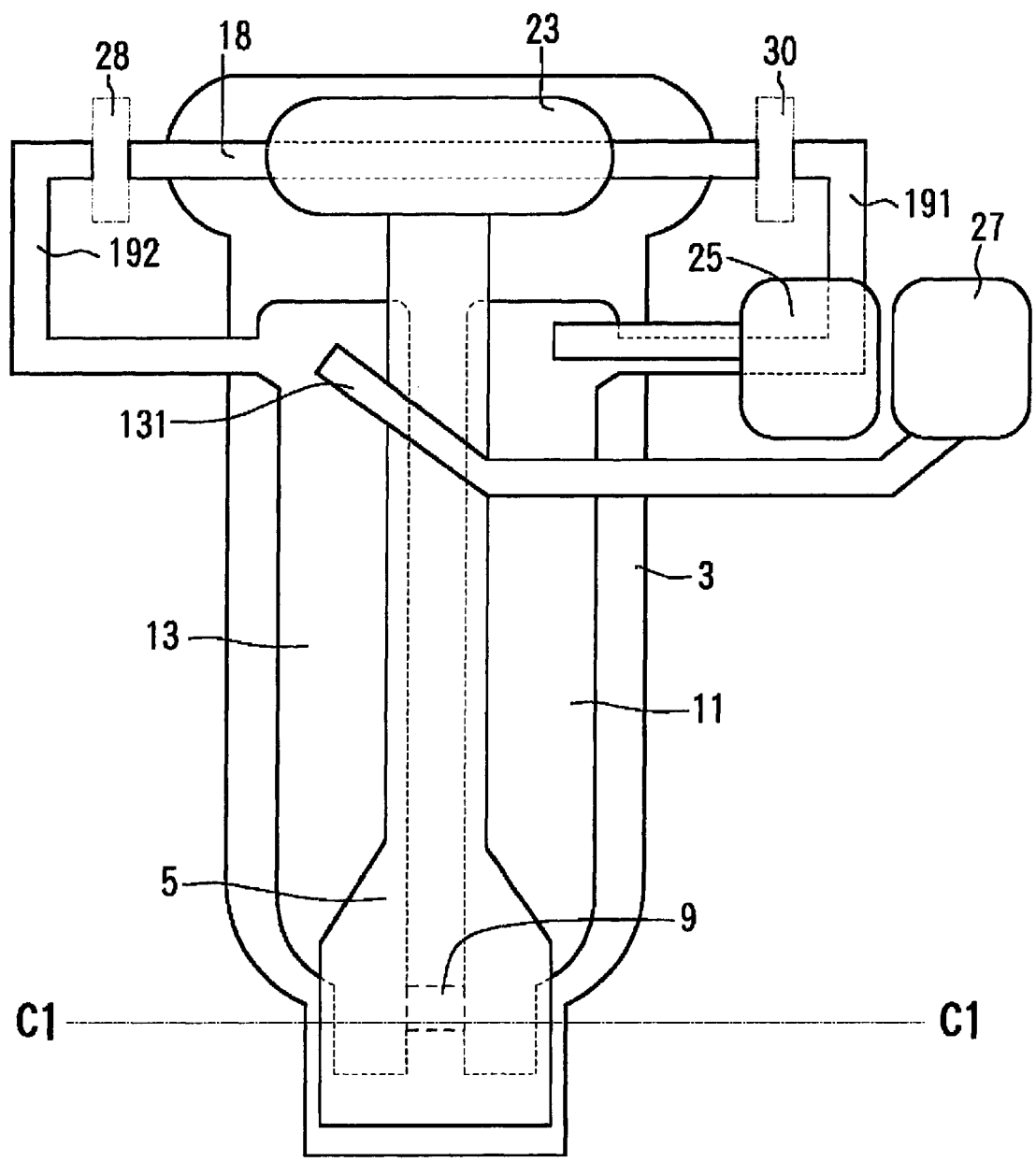
FIG. 33 is a plan view illustrating the conductive member obtained by the process shown in FIGS. 28–32, while the inductive type thin film magnetic head is removed.

FIG. 33 is a plan view showing the conductive member of the thin film magnetic head element after the above mentioned cutting, while the inductive type thin film magnetic head element is removed. The conductive films 191 and 192 are cut at the holes 28 and 30.

In the thin film magnetic head assembly of the present embodiment, the first and second electrode films 11 and 13 are electrically separated from the first and second shield films 3 and 5, and therefore the insulating property of the first and second insulating films 71 and 72 can be measured on the wafer between the first terminal conductor 23 and the second terminal conductor 25 or third terminal conductor 27.

The end surfaces of the first, second and third terminal conductors 23, 25 and 27 are exposed in the third insulating film 21, and therefore the measurement of the insulating property can be conducted simultaneously for all a number of thin film magnetic head elements Q11–Qnm by contacting a probe array having a pattern corresponding to the first to third terminal conductors 23–27 with these terminal conductors.

Figure 34:
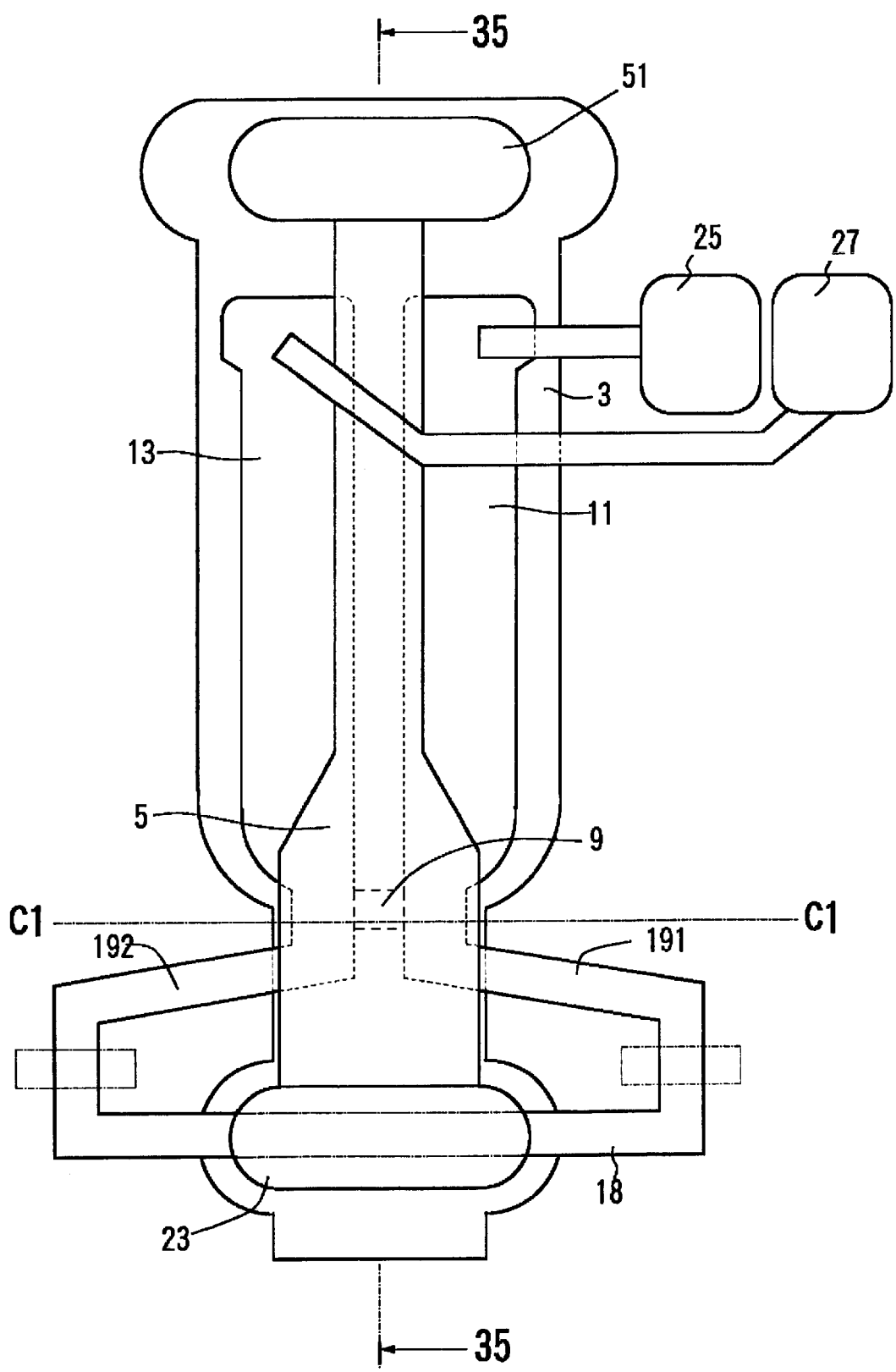
FIG. 34 is a plan view depicting the conductive member of still another embodiment of the thin film magnetic head assembly, while the inductive type thin film magnetic head is removed.
Figure 35:
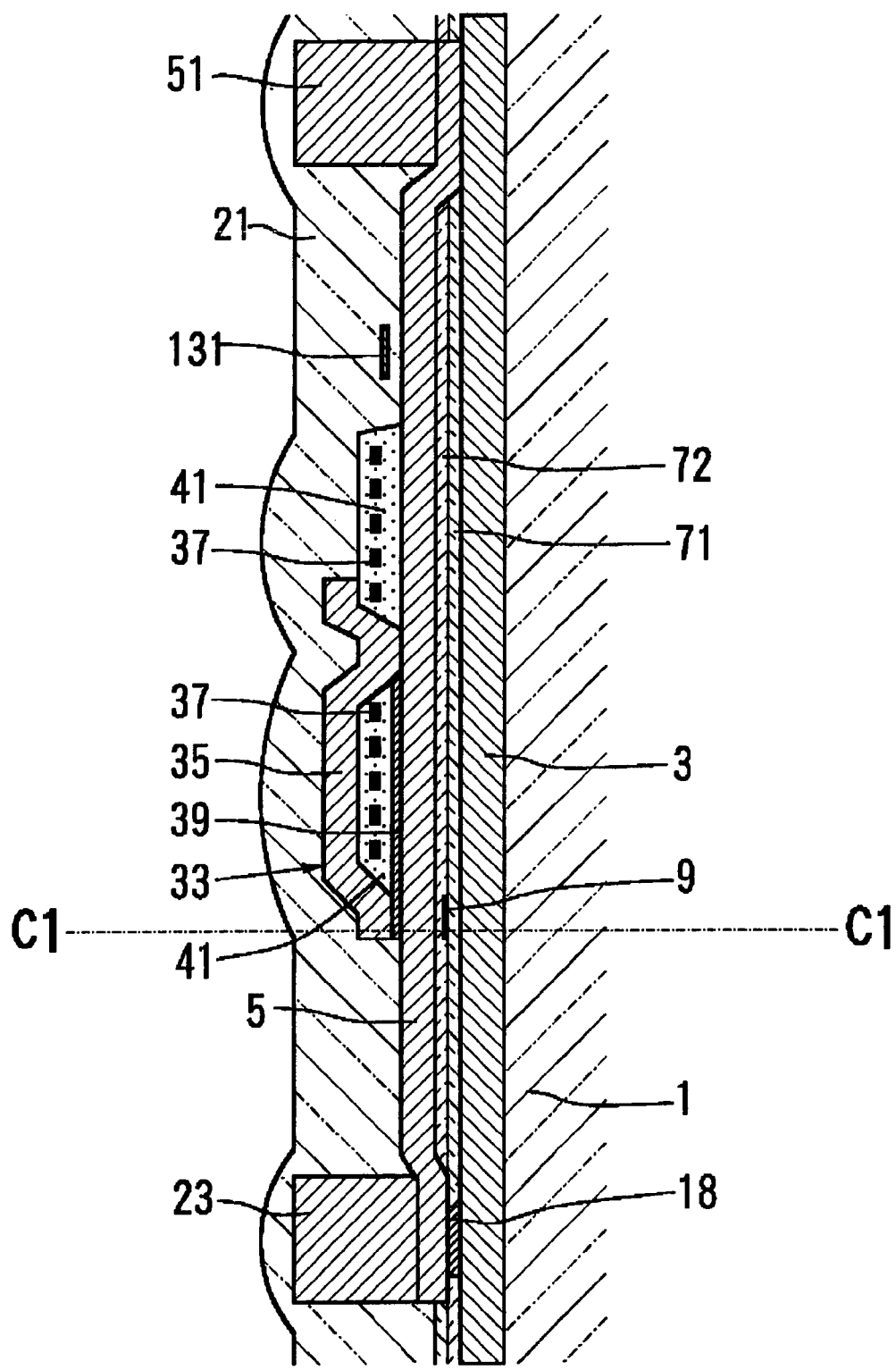
FIG. 35 is a cross sectional view cut along a line 35—35 in FIG. 34.
Figure 36:
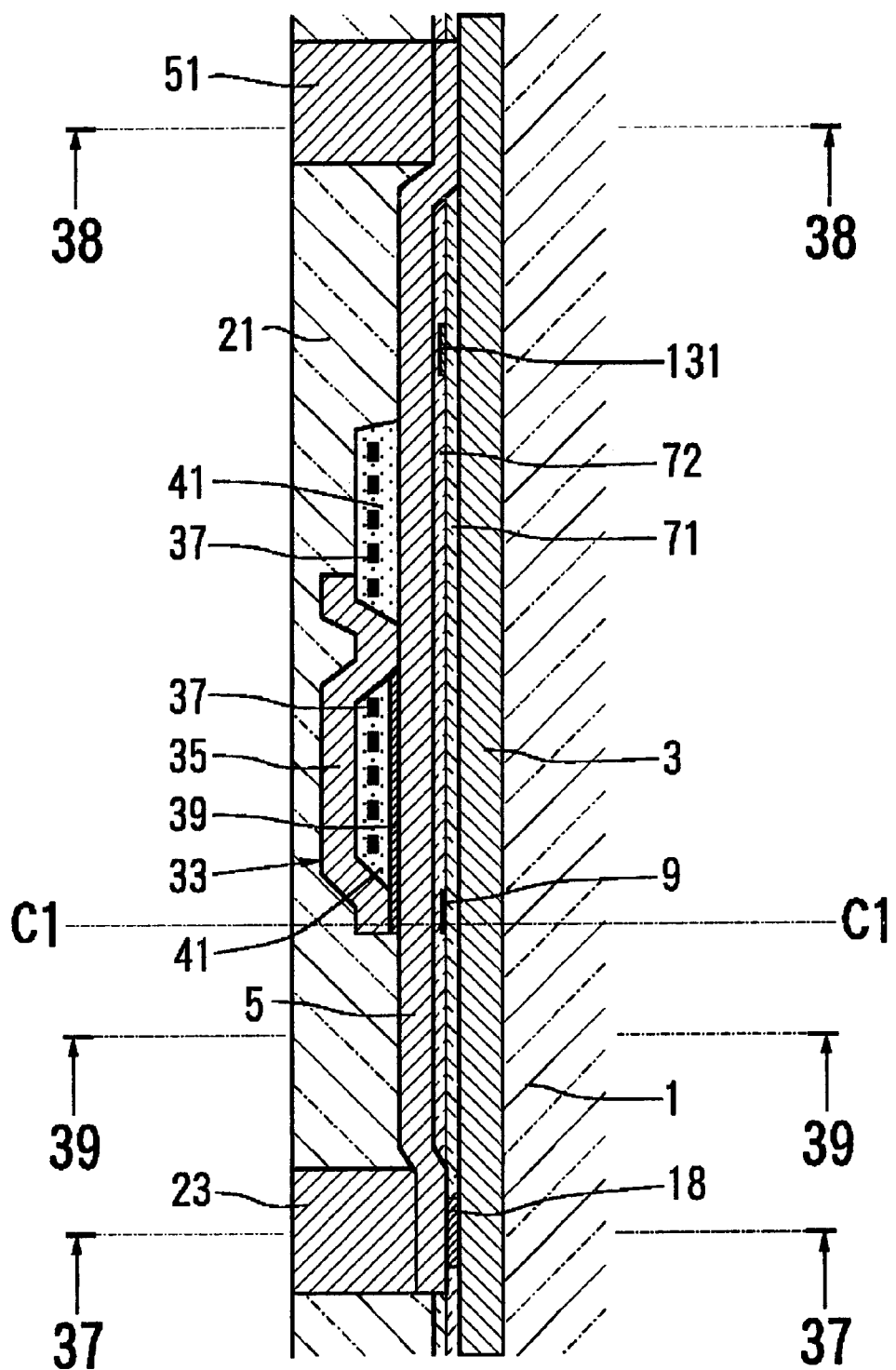
FIG. 36 is a cross sectional view representing the method of manufacturing the magnetic head wafer shown in FIGS. 34 and 36.
Figure 37:
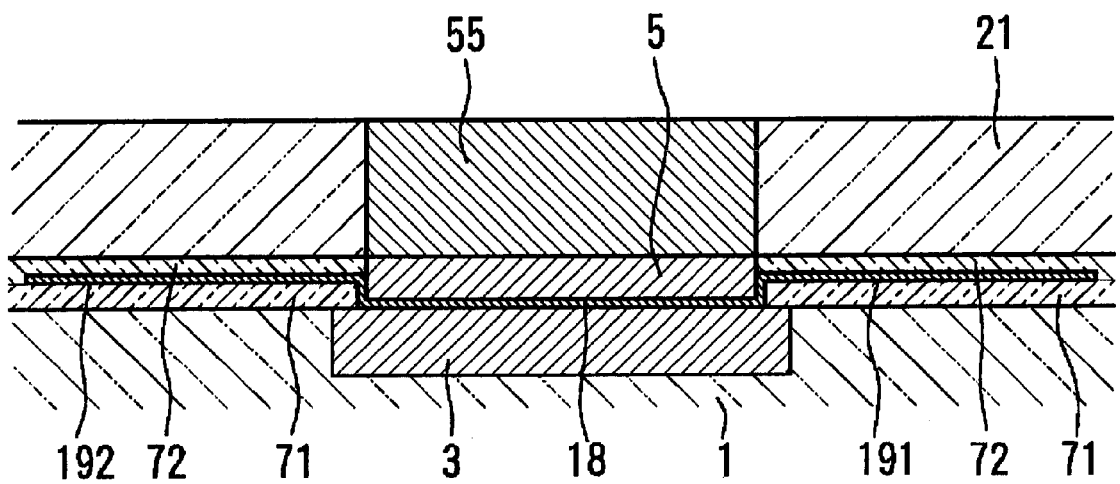
FIGS. 37, 38, 39 and 40 are cross sectional views cut along lines 37—37, 38—38, 39—39 and 40—40, respectively in FIG. 36.
Figure 38:
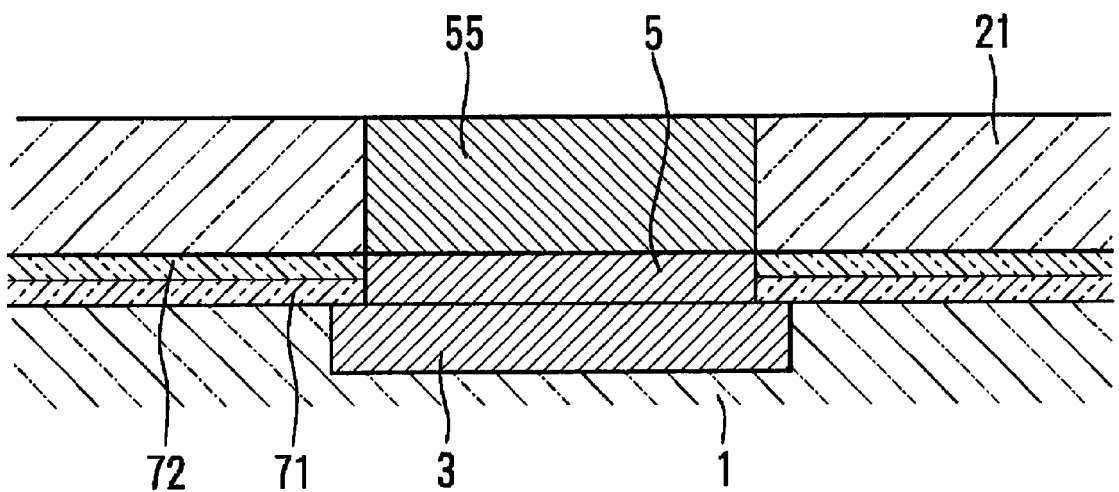
Figure 39:
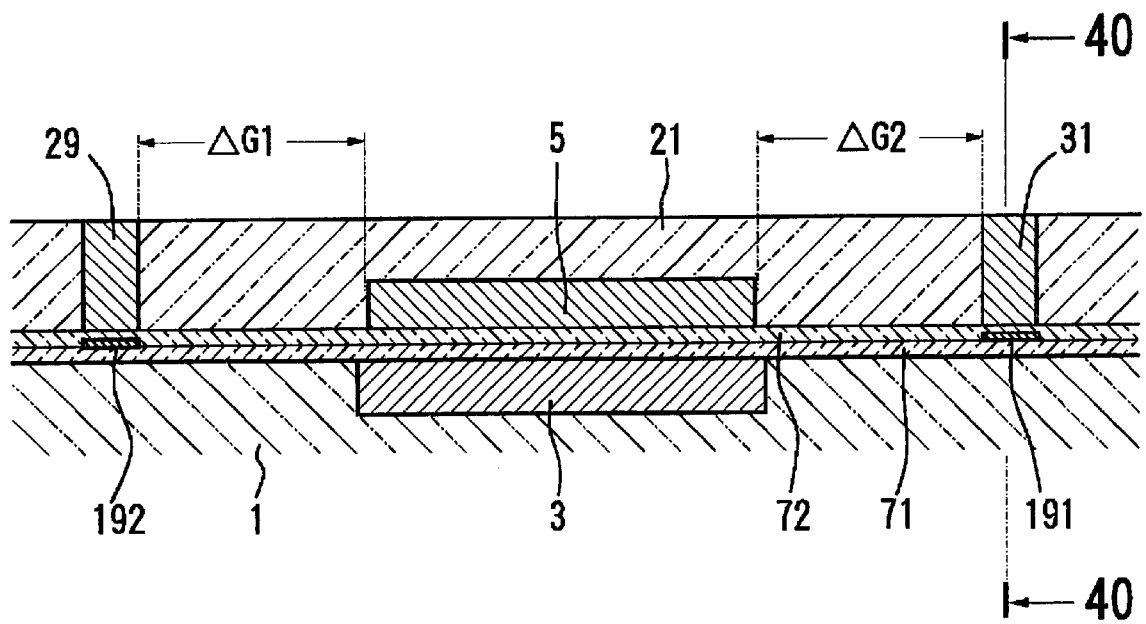
Figure 40:
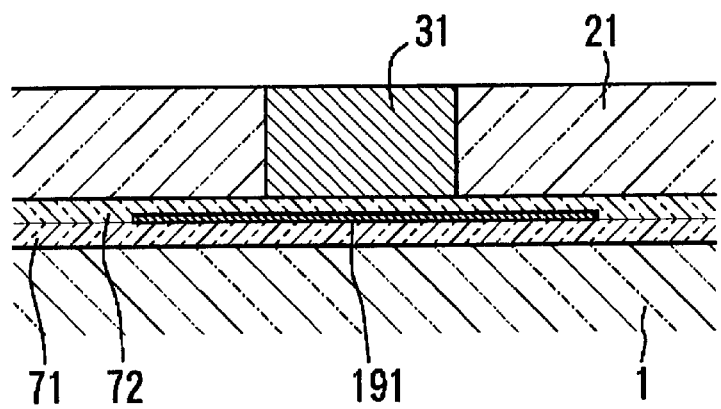

FIG. 34 is a plan view illustrating a conductive member of still another embodiment of the thin film magnetic head assembly according to the invention, while the inductive type thin film magnetic head element is removed, and FIG. 35 is a cross sectional view cut along a line 35—35 in FIG. 34. In these figures, portions similar to those of the previous embodiments are denoted by the same reference numerals used in the previous embodiments.

Also the present embodiment includes the first terminal conductor 23 and a fourth terminal conductor 51. The first terminal conductor 23 is provided on the second shield film 5 at a forward portion with respect to the magnetoresistive element 9, and the fourth terminal conductor 51 is formed on the second shield film at a backward portion with respect to the magnetoresistive element 9. The second shield film 5 is connected to the first shield film 3 by means of the bridge portion 18 at a forward area and is directly connected to the first shield film 3 at a backward area.

FIGS. 36–41 show a method of manufacturing the magnetic wafer shown in FIGS. 31 and 34. At first, as shown in FIGS. 36–40, the surface of the third insulating film 21 is polished to expose the end surfaces of the first, second, third and fourth terminal conductors 23, 25, 27 and 51 together with end surfaces of the first and second metal films 29 and 31. Although not shown in the drawings, end surfaces of the terminal conductors 43 and 45 (refer to FIG. 2) of the inductive type thin film magnetic head element 33 are exposed in the third insulating film 21. Then, the first to fourth terminal conductors 23,25,27 and 51 may be used as connecting terminals upon measuring the insulating property on the wafer.

Figure 41:
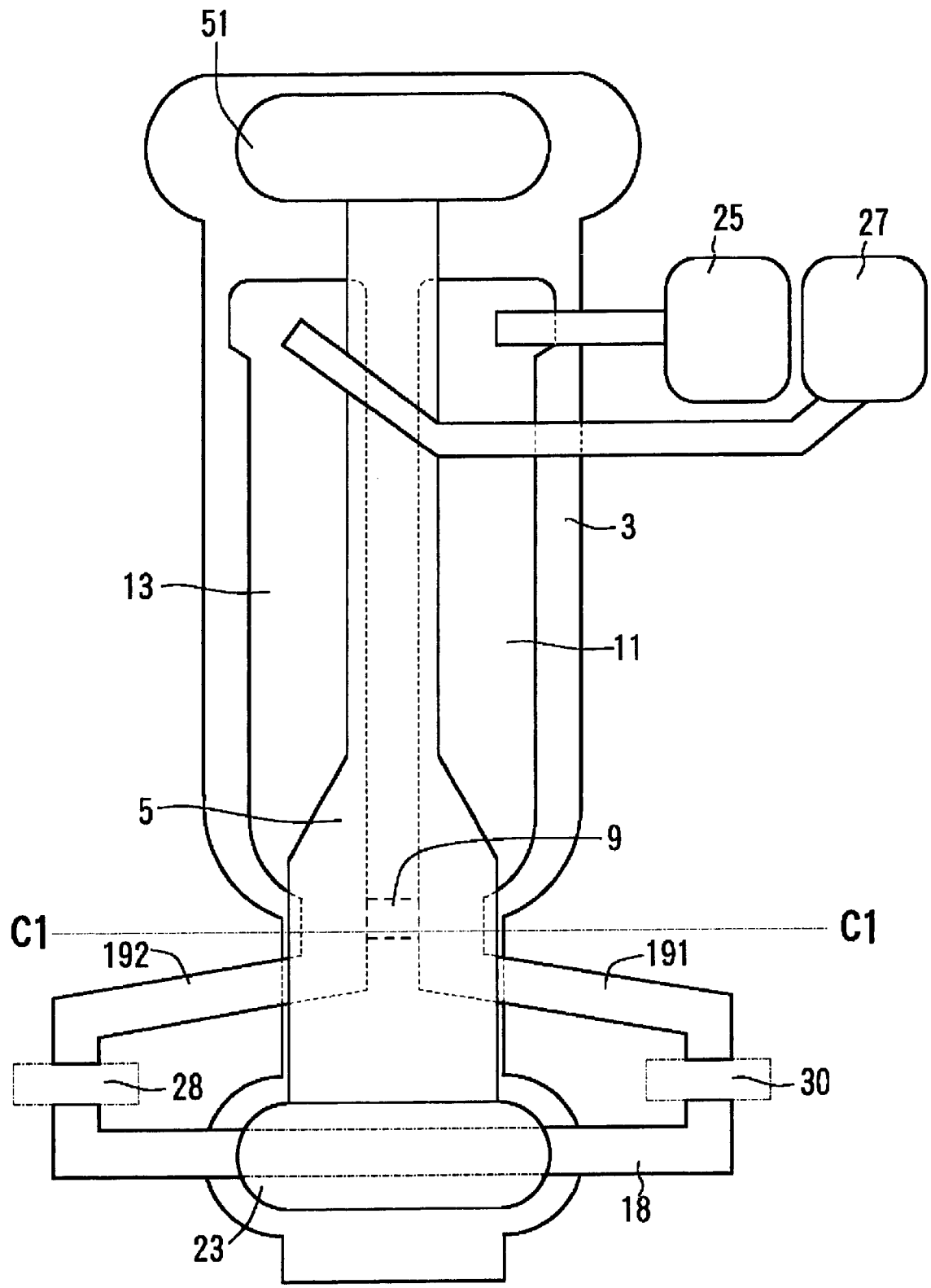
FIG. 41 is a plan view depicting the conductive member of the thin film magnetic head assembly obtained by the steps of FIGS. 36–40, while the inductive type thin film magnetic head is removed.

After that, the processes illustrated in FIGS. 29–32 are carried out to cut the conductive films 191 and 192 electrically connected to the first and second electrode films 11 and 13. FIG. 41 shows a condition after the above cutting operation. The conductive films 191 and 192 are cut at the cutting sections 28 and 30 over suitable lengths.

In the thin film magnetic head assembly having the above mentioned structure, the first and second electrode films 11 and 13 are electrically separated from the first and second shield films 3 and 5. Therefore the insulating property of the first and second insulating films 71 and 72 can be measured on the wafer between the first terminal conductor 23 and the second terminal conductor 25 or third terminal conductor 27.

The end surfaces of the first, second, third and fourth terminal conductors 23, 25, 27 and 51 are exposed in the third insulating film 21, and thus the measurement of the insulating property can be conducted simultaneously for all a number of thin film magnetic head elements Q11–Qnm by contacting a probe array having a pattern corresponding to the first to fourth terminal conductors 23, 25, 27 and 51 with these terminal conductors.

In the final the thin film magnetic head, the first terminal conductor 23, conductive films 191, 192 of the electrode films 11, 13 and bridge portion 18 all situating forwardly with respect to the magnetoresistive element 9 are not remained, because the cutting operation is performed along the cut-line C1.

Contrary to this, the fourth terminal conductor 51 situating backward with respect to the magnetoresistive element 9 is remained in the thin film magnetic head. Therefore, the insulating property of the first and second insulating films 71 and 72 between the first and second shield films 3, 5 and the first and second electrode films 11, 13 can be measured by utilizing the fourth terminal conductor 51 even in the completed thin film magnetic head.

Furthermore, in the present embodiment, after the wafer process and cutting process along the cut-line C1—C1, the breakage of the insulating films can be prevented by applying the electrically paste on the surface of the protection film 21 to short-circuit the terminal conductors.

As explained above, the electrical connection between the magnetoresistive element 9 and the first and second shield films 3 and 5 may be cut both by the dry etching and wet etching. It is preferable to use the wet etching. In the wet etching, electrostatic charge can be controlled much more easily that in the dry etching, and therefore the breakage of the magnetoresistive element 9 due to the electrostatic charge can be prevented.

Since the wet etching is a preparatory step for the measurement of the insulating resistance and the property of the magnetoresistive element 9, the wet etching may be conducted just before the measuring step. For instance, if the measurement of the insulating resistance and the property of the magnetoresistive element 9 is carried out at a final step of the wafer process, the wet etching may be performed immediately before the measuring step. If the measuring step is conducted during the wafer process, the wet etching may be carried out immediately before the measuring step during the wafer process. Now this will be explained with reference to concrete examples.

Figure 42:
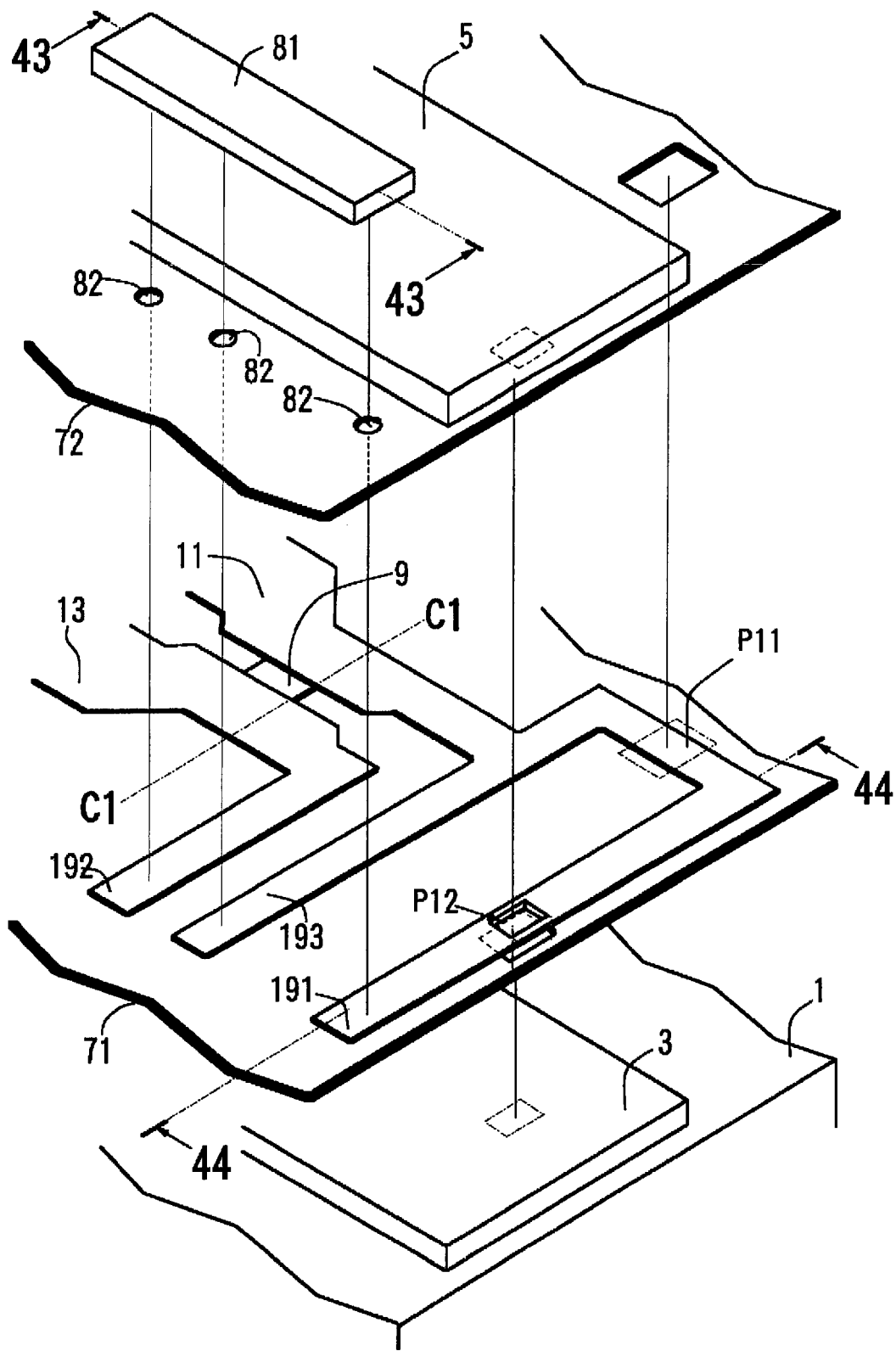
FIG. 42 is a exploded perspective view showing an embodiment in which a wet etching is applicable after the formation of the second shield film.
Figure 43:
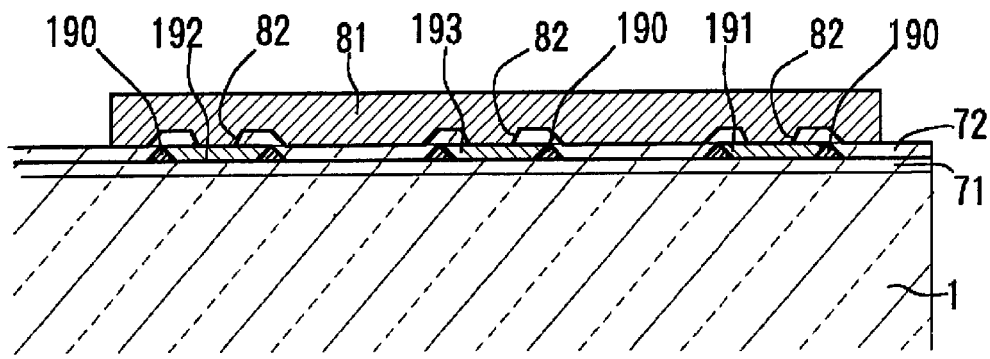
FIGS. 43 and 44 are cross sectional views cut along lines 43—43 and 44—44 in FIG. 42.
Figure 44:
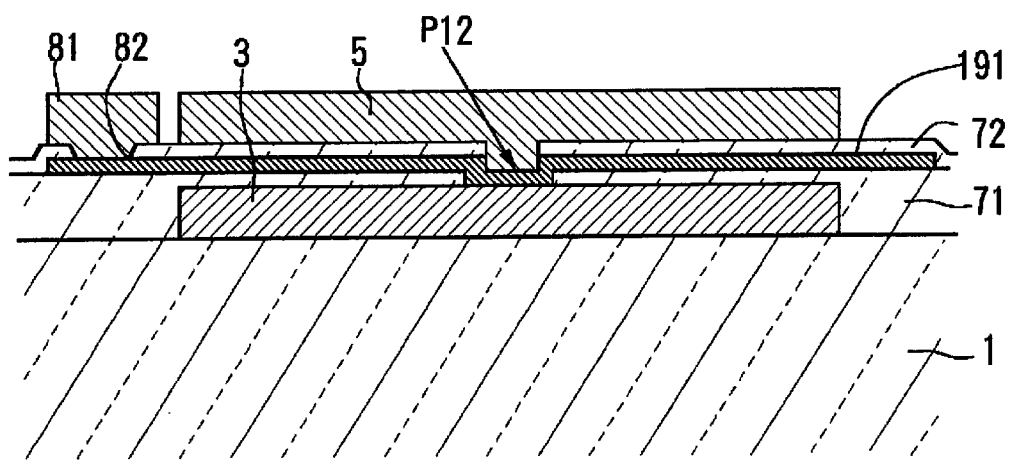

FIG. 42 is a perspective view showing an embodiment of the thin film magnetic head assembly to which the wet etching may be applied. The drawing shows a condition after the formation of the second shield film 5. FIG. 43 is an enlarged cross sectional view cut along a line 43—43 in FIG. 42 and FIG. 44 is an enlarged cross sectional view cut along a line 44—44 in FIG. 42. In the drawings, portions similar to those shown in the previously explained drawings are denoted by the same reference numerals used in the previously explained drawings.

The conductive film includes first to third conductive films 191–193. The first conductive film 191 is electrically connected to the first electrode film 11 and is extended to be bent by 90 degrees in an area situating forwardly with respect to the cut-line C1. The first and third conductive films 191 and 193 are electrically connected to the first electrode film 11. The first conductive film 191 includes a cutting portion P11 as well as a connecting portion P12 by means of which the first conductive film 191 is electrically connected to the first and second shield films 3 and 5. The second conductive film 192 is extended substantially in parallel with the third conductive film 193 and is separated from the third conductive film. The third conductive film 193 is extended in an opposite direction to a direction in which the first conductive film 191 extends.

The first, second and third conductive films 191, 192 and 193 are electrically connected to each other by means of a connecting conductor 81. This short-circuiting conductor 81 may be formed in a process in which the second shield film 5 is formed. In this case, the connecting conductor 81 may be made of a same material as the second shield film 5 such as NiFe. The connecting conductor 81 is connected to the first to third conductive films 191–193 via through holes 82.

In this manner, the first electrode film 11 is connected to the first and second shield films 3 and 5 by means of two parallel paths, one being formed by the first conductive film 191, cutting portion P11 and connecting portion P12, and the other being formed by the third conductive film 193, connecting conductor film 81, first conductive film 191, connecting portion P11 and connecting portion P12.

Also the second electrode film 11 is electrically connected to the first and second shield films 3 and 5 by means of two parallel paths, one being formed by the second conductive film 192, connecting conductive film 81, first conductive film 191, cutting portion P11 and connecting portion P12, and the other being formed by the third conductive film 193, first conductive film 191, cutting portion P11 and connecting portion P12.

After forming the connecting conductive film 81 through the steps shown in FIGS. 42–44, the first conductive film 191 is cut at the cutting portion P11. This cutting may be performed by the dry etching. Even after cutting the first conductive film 191, the first electrode film 11 is electrically connected to the first and second shield films 3 and 5 by means of the path formed by the third conductive film 193, connecting conductive film 81 and first conductive film 191.

Further, the second electrode film 13 is also connected to the first and second shield films 3 and 5 by means of the path formed by the second conductive film 192, connecting conductive film 81 and first conductive film 191.

Therefore, the first and second electrode films 11 and 13 become equipotential with the first and second shield films 3 and 5. This results in that even when the first conductive film 191 is cut by the dry etching at the cutting portion P11, no voltage is applied across the first and second insulating films 71 and 72 between the first and second electrode films 11, 13 and the first and second shield films 3, 5. In this manner, the degradation of the insulating property as well as the breakage of the first and second insulating films 71 and 72 can be prevented.

Therefore, during a step of forming the magnetoresistive element, an electric connecting path between the first and second shield films 3, 5 and the magnetoresistive element 9 may be made of a material which is not suitable for the wet etching.

In accordance with the progress of the manufacturing process, immediately before a step of measuring the insulating property between the magnetoresistive element 9 and the first and second shield films 3, 5, the connecting conductive film 81 is removed by the wet etching. Then, the magnetoresistive element 9 is isolated from the first and second shield films 3, 5, and therefore the measurement of the insulating property becomes possible.

When it is desired to maintain the electrical connection between the magnetoresistive element 9 and the first and second shield films 3, 5 after the formation of the protection film, the connecting conductive film 81 has to be free from the insulating film. Furthermore, a thickness of the connecting conductive film 81 to be removed by the wet etching has to be larger than a thickness of the protection film. In this manner, after forming the protection film, the connecting conductive film 81 maybe exposed in the protection film 21 by polishing. An exposed surface of the connecting conductive film 81 may be covered with gold or resist. By utilizing an etchant which does not attack the protection film during the wet etching process, the first and second shield films 3, 5 can be isolated from the magnetoresistive element 9 by the selective etching.

FIGS. 45–48 show a concrete example of the wet etching process, in which the electrical connection between the first and second shield films 3, 5 and the magnetoresistive element 9 is maintained after the step of forming the protection film.

Figure 45:
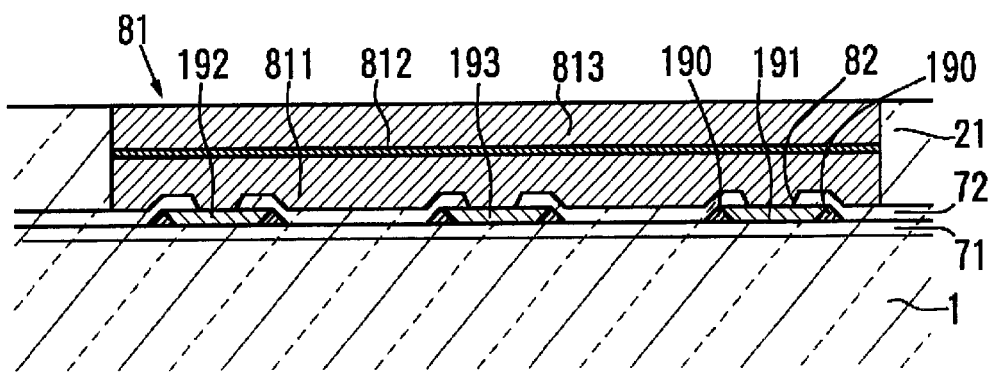
FIG. 45 is an enlarged cross sectional view depicting a condition after the formation of the protection film.

FIG. 45 is a cross sectional view depicting the short-circuiting portion after the formation of the protection film. The connecting conductive film 81 is formed by a stack of films 811, 812 and 813, the film 811 being applied upon forming the second shield film 5 and the film 812 being applied upon forming the second and third terminal conductors 25, 27. The conductive film 811 is made of, for instance NiFe, the conductive film 812 is formed by a Ti film which constitutes a seed layer of the second and third terminal conductors 25, 27, and the conductive film 813 is formed by a Cu film while constitutes a bulk of the second and third terminal conductors 25, 27. Usually, the magnetoresistive element component 190 is remained underneath the contour portions (peripheral portions) of the first and second electrode films 11, 13 and first to third conducive films 191–193.

Figure 46:
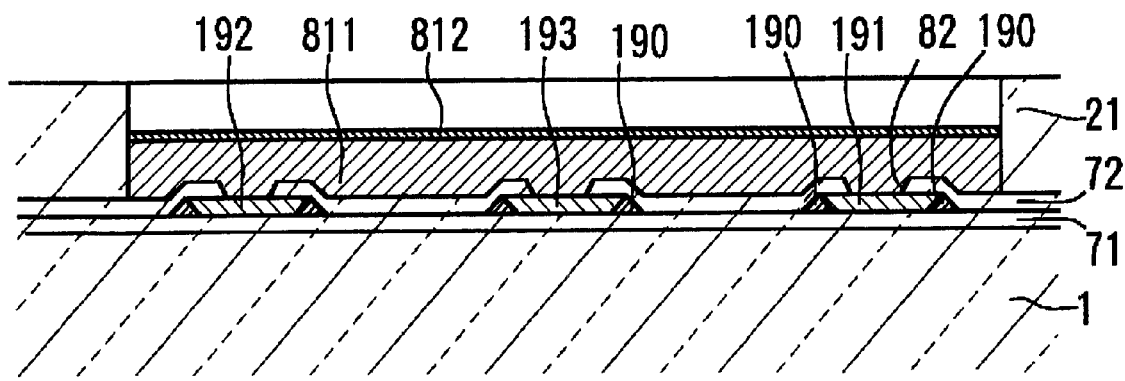
FIG. 46 is an enlarged cross sectional view illustrating a wet etching process.

Upon the wet etching, as illustrated in FIG. 46, the conductive film 813 of the connecting conductive film 81 is removed by the wet etching. When the connecting conductor film 813 is made by the Cu film, an iron chloride solution may be used as an etchant.

Figure 47:
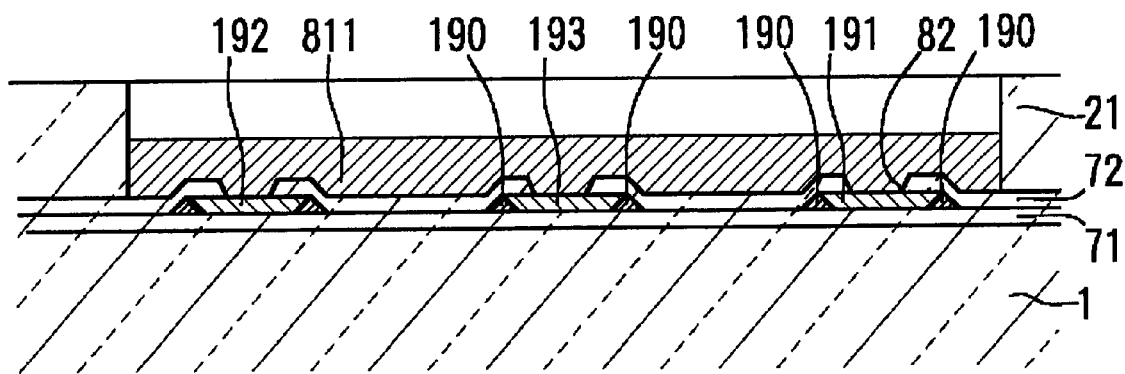
FIG. 47 is an enlarged cross sectional view showing a wet etching step after the step shown in FIG. 46.
Figure 48:
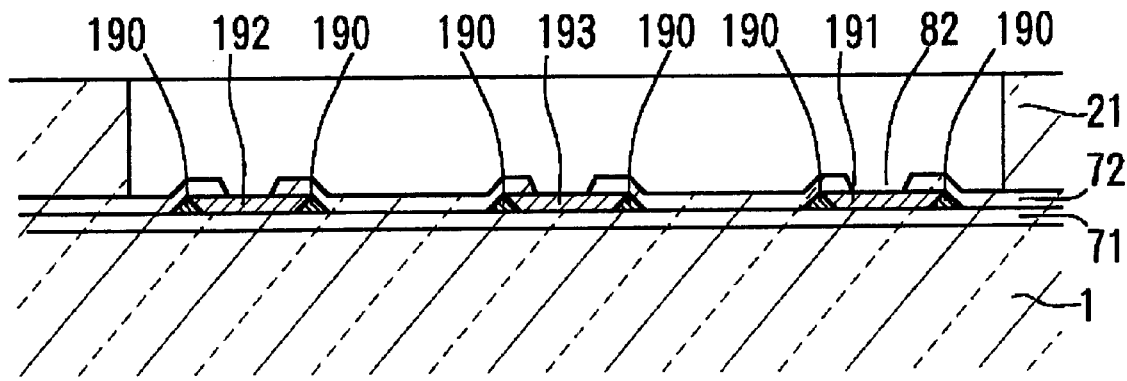
FIG. 48 is an enlarged cross sectional view showing a wet etching step after the step shown in FIG. 47.

Next, as depicted in FIG. 47, the conductive film 812 is removed by the wet etching. When the conductive film 812 is formed by the NiFe film, an iron chloride solution may be used as an etchant. In this manner, the magnetoresistive element 9 can be isolated from the first and second shield films 3, 5, and thus the measuring of the insulating property as well as the property of the magnetoresistive element 9 becomes possible.

The first and second electrode films 11, 13 and first to third conductive films 191–193 are made of a material which is not attacked by the etchant for removing the conductive film 811. The conductive film 811 is formed during the step in which the second shield film 5 is formed, and thus is generally made of NiFe. The NiFe film is usually wet-etched by an iron chloride solution. Therefore, the first and second electrode films 11, 13 and first to third conductive films 191–193 extending to the electrode films are made of a material which is hardly etched by the iron chloride solution.

The first and second electrode films 11 and 13 extend to the magnetoresistive element 9, and furthermore in many cases, the magnetoresistive element component 190 is remained beneath the contour portions (peripheral portions) of the first and second electrode films 11, 13 and first to third conductive films 191–193 (refer to FIGS. 45–48). The magnetoresistive element 9 includes a film which is liable to be attacked by the etchant. When the magnetoresistive element 9 is formed by GMR, it includes NiFe film, Cu film and Co alloy film which are liable to be etched by the iron chloride solution. Therefore, the insulating films 71 and 72 and insulating film 21 surrounding the connecting conductive film 81 are made of a material which is hardly attacked by the iron chloride solution, particularly alumina. Then, the etching does not proceed up to the magnetoresistive element 9 and the remaining magnetoresistive element component 190.

It is preferable to provide the anti-charging means or discharging means in the wet etching apparatus. The discharging means may be realized by an ionizer, and the anti-charging may be performed by connecting nozzles, stages and handlers provided in the wet etching apparatus to the ground or by increasing the conductivity of a washing water by resoling a carbon oxide gas therein.

The connecting conductive film 81 removed by the wet etching may be made of one of Fe, Co, Cu, Ti, Cr and Ni or alloys these metals. Particularly, the connecting conductive film 81 may be made of an alloy containing Ni and Fe, an alloy containing Cu and Fe as a main component and other elements as solid solution, or an alloy containing Co as a main component. The connecting conductive film 81 may be preferably formed by plating.

The conductors such as the first, second and third conductive films 191, 192 and 193 may be made of Ta, Ti, Cr, W, Re, Au, Pt, Ru, Rh, Ir or Pd or at least one kinds of alloys of these elements.

In this case, it is absolutely necessary that all contact portions between the connecting conductive film 81 and the first to third conductive films 191–193 are situated within the contours of the first to third conductive films 191–193, and that the first to third conductive films 191–193 are completely covered with the insulating film 72 except for the contact portions between the conductive films 191–193 and the connecting conductive film 81. Then, the magnetoresistive element 9 formed by GMR can be prevented from being damaged by the etching along the contours.

The above mentioned insulating film 72 may be preferably made of alumina, aluminum nitride or a mixture thereof. In the present embodiment, the through holes 82 are formed in the insulating film 72 within the contours of the first to third conductive films 191–193, and the connecting conductive film 81 is connected to the first to third conductive films 191–193 via these through holes 82.

Figure 49:
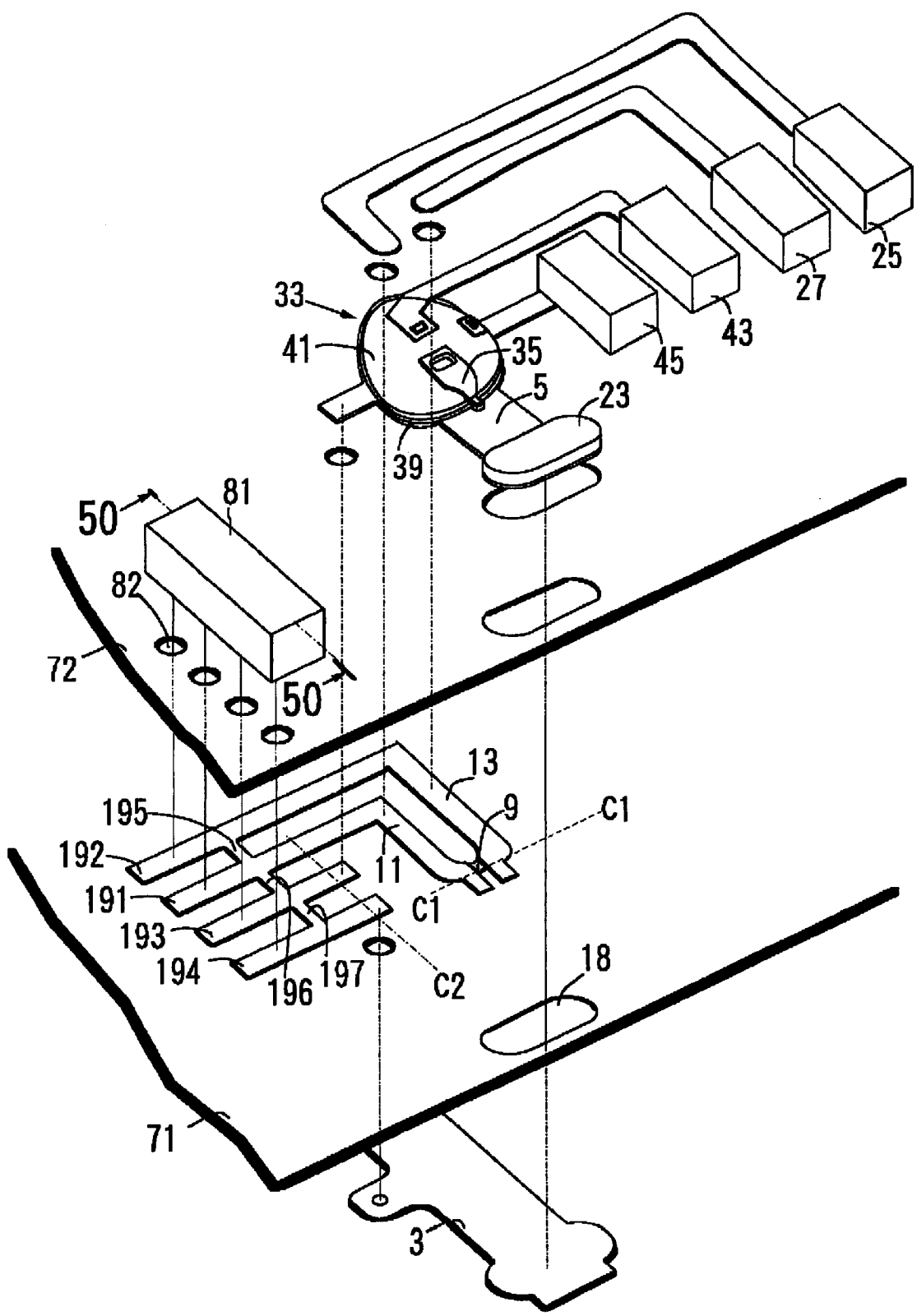
FIG. 49 is a perspective view showing another embodiment in which the wet etching is applicable.
Figure 50:
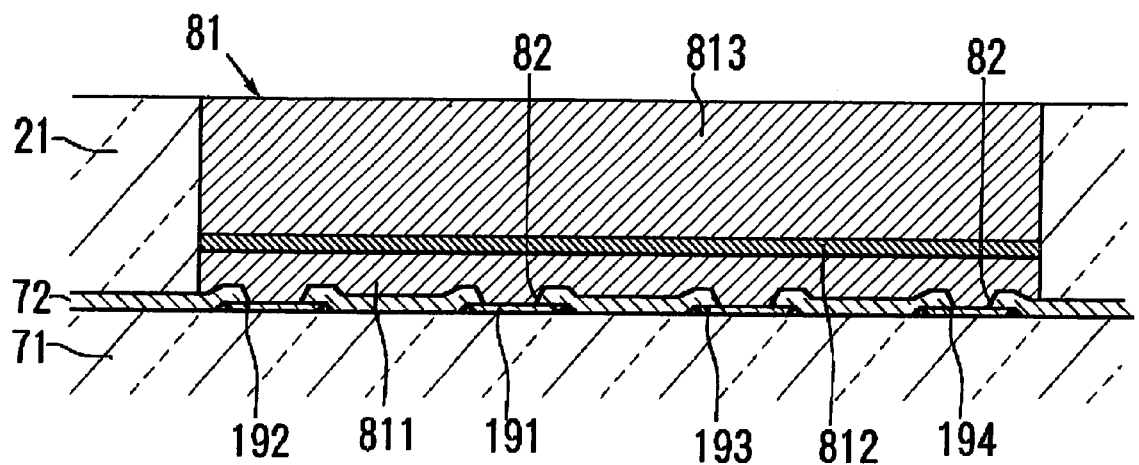
FIG. 50 is an enlarged cross sectional view cut along a line 50—50 in FIG. 49.

FIG. 49 is a perspective view showing another embodiment of the thin film magnetic head assembly to which the wet etching may be applied. The drawing shows a condition after the formation of the protection film 21. FIG. 50 is an enlarged cross sectional view cut along a line 50—50 in FIG. 49. In these drawings, portions similar to those shown in the previously explained drawings are denoted by the same reference numerals used in the previously explained drawings.

In the drawings, the conductive film includes first to fourth conductive films 191–194. The first conductive film 191 is electrically connected to the first electrode film 11. The first conductive film 191 is extended backward with respect to the magnetoresistive element 9 and is be bent by 90 degrees. The first electrode film 11 is electrically connected to the second terminal conductor 25, and the second electrode film 13 is electrically connected to the third terminal conductor 27.

The second conductive film 192 electrically connected to the second electrode film 13 is extended backward with respect to the magnetoresistive element 9 substantially in parallel with the first conductive film 191, and is bent at 90 degrees. The third and fourth conductive films 193 and 194 are extended along a side of the first conductive film 191 with interposing a space therebetween. The third and fourth conductive films 193 and 194 are extended with interposing a space therebetween. The third conductive film 193 is electrically connected to the second shield film 5 through the second insulating film 72, and the fourth conductive film 194 is electrically connected to the first shield film 3 through the first insulating film 71.

The first to fourth conductive films 191–194 are electrically connected to each other by means of first to third connecting conductive films 195–197. The first to third connecting conductive films 195–197 may be made of a same material as the first to fourth conductive films 191–194 or may be made of a different material.

Furthermore, the first to fourth conductive films 191–194 are electrically short-circuited by means of the connecting conductive film 81. As illustrated in FIG. 50, the connecting conductive film 81 is formed by a stack of a conductive film 811 formed in the step of forming the second shield film 5, and conductive films 812 and 813 formed in the step of forming the second and third terminal conductors 25 and 27. The conductive film 811 is made of, for instance NiFe, the conductive film 812 is formed by a Ti film serving as a seed film of the second and third terminal conductors 25 and 27, and the conductive film 813 is formed by a Cu film which constitutes a bulk of the second and third terminal conductors 25 and 27.

In the above mentioned structure, the first electrode film 11 is connected to the first and second shield films 3 and 5 by means of two parallel paths, one being formed by the first conductive film 191, connecting conductive film 81, third conductive film 193 and fourth conductive film 194, and the other being formed by the first conductive film 191, second connecting conductive film 196, third conductive film 193, third connecting conductor film 197, and fourth conductive film 194.

Also the second electrode film 11 is electrically connected to the first and second shield films 3 and 5 by means of two parallel paths, one being formed by the second conductive film 192, connecting conductive film 81, third conductive film 193 and fourth conductive film 194, and the other being formed by the second conductive film 192, first connecting conductive film 195, first conductive film 191, second connecting conductive film 196, third connecting conductive film 197 and fourth conductive film 194.

After forming the connecting conductive film 81, the first to third connecting conductive films 195–197 are cut. This cutting may be performed by the dry etching. Even after cutting the first to third connecting conductive films 195–197, the first conductive film 191 is electrically connected to the first and second shield films 3 and 5 by means of the path formed by the first conductive film 191, connecting conductive film 81, third conductive film 193 and fourth conductive film 194. The cutting timing may be selected after the formation of a part of the connecting conductive film 81, e.g. the conductive film 811.

Further, the second electrode film 13 is also connected to the first and second shield films 3 and 5 by means of the path formed by the second conductive film 192, connecting conductive film 81, third conductive film 193 and fourth conductive film 194.

Therefore, the first and second electrode films 11 and 1 3 become equipotential with the first and second shield films 3 and 5, and therefore even when the connecting conductive films 195–197 are cut by the dry etching, no voltage is applied across the first and second insulating films 71 and 72 between the first and second electrode films 11, 13 and the first and second shield films 3, 5. In this manner, the degradation of the insulating property as well as the dielectric breakdown of the first and second insulating films 71 and 72 can be prevented.

Figure 51:
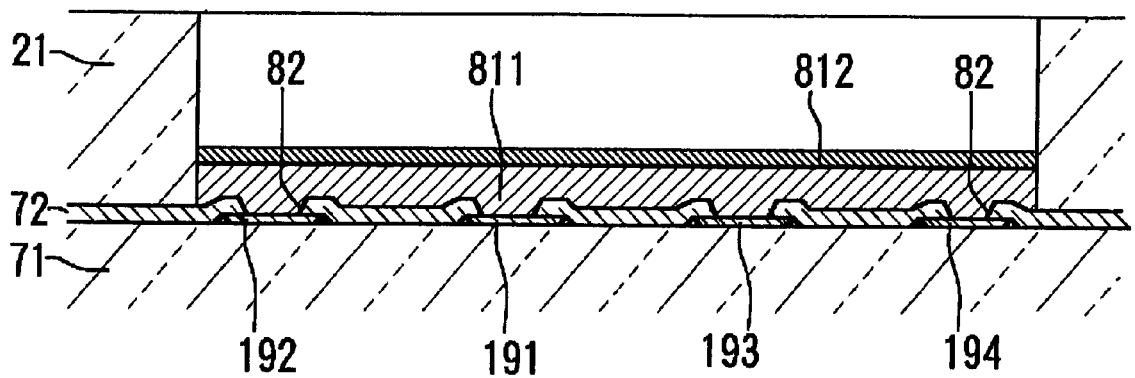
FIG. 51 is an enlarged cross sectional view illustrating a wet etching process in the embodiment shown in FIGS. 49 and 50.
Figure 52:
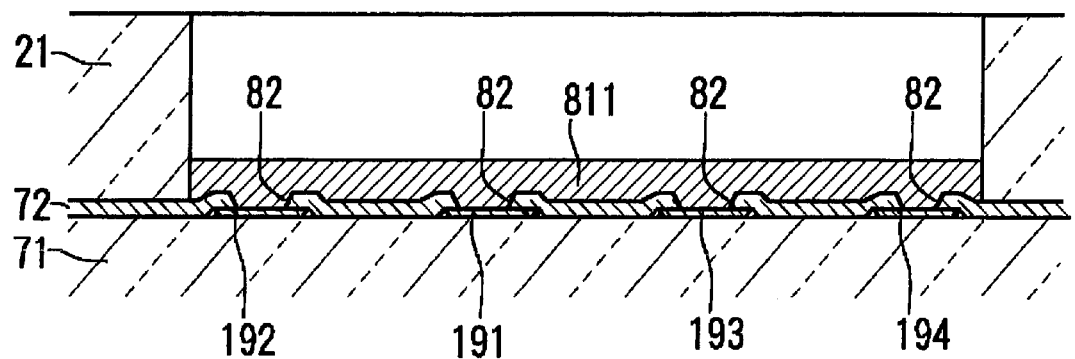
FIG. 52 is an enlarged cross sectional view depicting a wet etching step after the step shown in FIG. 51.

After that, necessary steps are carried out until a step of measuring the insulating property between the magnetoresistive element 9 and the first and second shield films 3, 5 as well as measuring the property of the magnetoresistive element 9. Then, as shown in FIG. 51, the conductive film 813 of the connecting conductive film 81 is removed by the wet etching, and further as illustrated in FIG. 52, the conductive film 812 is removed by the wet etching.

Figure 53:
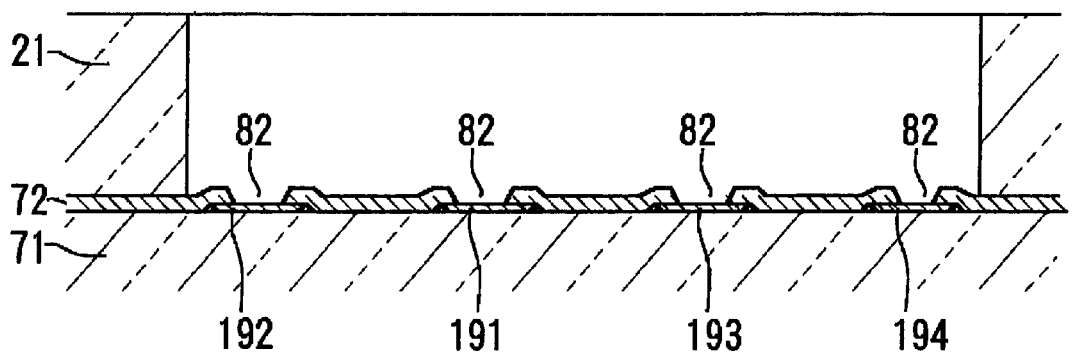
FIG. 53 is an enlarged cross sectional view illustrating a wet etching step after the step of FIG. 52.

Next, as depicted in FIG. 53., the conductive film 811 is removed by the wet etching. Then, the magnetoresistive element 9 is completely isolated from the first and second shield films 3, 5, and thus the insulating property as well as the property of the magnetoresistive element 9 can be measured.

As explained above, the first and second electrode films 11, 13, the first to fourth conductive films 191–194 connected to these electrode films, and the first to third connecting conductive films 195–197 have to be made of a material which is not attacked by the etchant for removing the conductive film 811, and the insulating films 71, 72 and protection film 21 surrounding the connecting conductive film 81 have to be made of a material which is hardly attacked by the iron chloride solution, particularly alumina. Furthermore, as stated above, the etching solution has to be selected in accordance with materials of the connecting conductive film 81.

Figure 54:
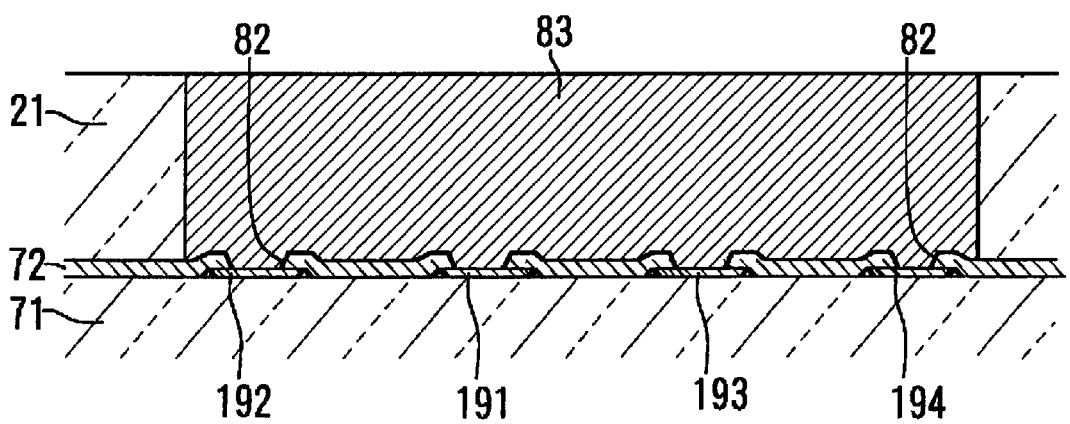
FIG. 54 is an enlarged cross sectional view showing a reformation of the conductive film.

According to the process, a connecting conductive film 83 may be deposited again on the first to fourth conductive films 191–194 connected to the first and second electrode films 11, 13 as shown in FIG. 54. This conductive film 83 may be formed by nonelectrolytic plating, CVD, resistance heating vapor deposition or coating. By providing the connecting conductive film 83, the first and second insulating films 71, 72 can be prevented from being damaged or brokendown during the bar process. In the base process, a plurality of bar-like head assembly are cut out of the wafer shown in FIG. 1, in the bar-like head assembly a plurality of thin film magnetic head elements being aligned, and necessary processes are conducted for the thus obtained bar-like head assembly.

In the slider process, a cutting operation is performed along a cut-line C2—C2. Then, the magnetoresistive element 9 is electrically separated from the first and second shield films 3, 5.

In the wafer process, information about poor insulation between the first and second shield films 3, 5 and the magnetoresistive element 9 could not be obtained as long as the first and second shield films 3, 5 and magnetoresistive element 9 are electrically connected to each other. However, yield about the poor insulation between the first and-second shield films 3, 5 and the magnetoresistive element 9 could be estimated in the following manner.

An required number of measuring patterns having the stacked structure and electrical connection equivalent to those of the thin film magnetic head element are formed on the wafer together with thin film magnetic head elements. At a suitable step after the formation of the magnetoresistive element, a part of an electric connection between a shield film and a magnetoresistive element in the measuring pattern is removed by the wet etching. After that, the insulating property between the shield film and the magnetoresistive element of the measuring pattern is measured. From a yield of this measurement, a yield of the magnetoresistive elements can be estimated, and a suitable treatment may be performed during the manufacturing step in accordance with the estimation. This procedure may be also applied to a case in which the measurement is not carried out for a whole number of elements. In this case, the element is not always necessary to have the above structure, but it is sufficient that the magnetoresistive element is electrically connected to the shield film.

As explained above, the present invention can provide the following functional advantages:

(a) it is possible to provide the thin film magnetic head assembly, in which the degradation of the insulating property or dielectric breakdown of the insulating films between the shield films and the electrode films during the wafer process can be prevented.

(b) it is possible to provide the thin film magnetic head assembly, in which the insulating property between the shield films and the electrode films can be measured during the wafer process.

(c) it is possible to provide the thin film magnetic head assembly, in which the electrode films can be electrically separated from the shield films without giving damage to the shield films.

(d) it is possible to provide the thin film magnetic head assembly, in which the dielectric breakdown between the shield films, electrode films and magnetoresistive element as well as the degradation of the property due to the dielectric breakdown during the bar process can be prevented.

What is claimed is:

1. A thin film magnetic head assembly having an air bearing surface, the thin film magnetic head assembly including a substrate and a plurality of thin film magnetic head elements provided on the substrate, wherein each of said thin film magnetic head element comprises:
    a first shield film formed to be supported by said substrate;
    a first insulating film formed on said first shield film;
    a magnetoresistive element formed on the first insulating film;
    first and second electrode films formed on said first insulating film to be connected to respective end portions of the magnetoresistive element;
    a second insulating film formed to cover said magnetoresistive element as well as said first and second electrode films;
    a second shield film formed on said second insulating film; and
    a conductive film formed on said first insulating film such that the conductive film extends outside a side edge of said second shield film in a direction parallel to the air bearing surface viewed in a film stacking direction and is connected to at least one of said first and second electrode films as well as to at least one of said first and second shield films; said conductive film will be cut out in a final thin film magnetic head.

2. A thin film magnetic head assembly according to claim 1, wherein said substrate is formed by a wafer and said plurality of thin film magnetic head elements are arranged on the wafer in matrix.

3. A thin film magnetic head assembly according to claim 2, wherein said conductive film constitutes mutually parallel first and second electric connecting paths, and said first electric connecting path includes a connecting conductive film made of a material which can be etched by a wet etching.

4. A thin film magnetic head assembly according to claim 3, wherein said connecting conducting film is made of a material by means of which the connecting conductive film can be selectively wet-etched without etching the surrounding protection film and electrode films.

5. A thin film magnetic head assembly according to claim 3, wherein said conductive film includes first, second and third conductive films, said first conductive film is electrically connected to said first electrode film as well as said first or second shield film, said second conductive film is electrically connected to said first electrode film, said third conductive film is electrically connected to said second electrode film, and said conductive film is electrically connected to said first to third conductive films through said second insulating film.

6. A thin film magnetic head assembly according to claim 5, wherein said connecting conductive film is electrically connected to said conductive films in an inner area of a contour of said conductive films.

7. A thin film magnetic head assembly according to claim 3, wherein said conductive film includes first, second, third and fourth conductive films which are successively arranged with given spacing and are electrically connected mutually, said first conductive film is electrically connected to said first electrode film, said second conductive film is electrically connected to said second electrode film, said third conductive film is electrically connected to said second shield film, said four th conductive film is electrically connected to said first shield film, and said connecting conductive film is electrically connected to said first to fourth conductive films through said second insulating film.

8. A thin film magnetic head assembly according to claim 7, wherein said connecting conductive film is electrically connected to said conductive films in an inner area of a contour of said conductive films.

9. A thin film magnetic head assembly according to claim 3, further comprising a measuring pattern formed on the wafer substrate, said measuring pattern formed on the wafer substrate, said measuring pattern including stack structure and electrical connection which are equivalent to those of said thin film magnetic head element.

10. A thin film magnetic head assembly according to claim 1, wherein said substrate is formed by a bar and said plurality of thin film magnetic head elements are aligned along a longitudinal direction of the bar.

11. A thin film magnetic head assembly according to claim 1, wherein said conductive film is extended above said first shield film, but outside the first shield film.

12. A thin film magnetic head assembly according to claim 1, wherein said conductive film is extended forwardly with respect to the magnetoresistive element opposite to extending directions of the first and second electrode films.

13. A thin film magnetic head assembly according to claim 1, wherein said conductive film is extended backward with respect to the magnetoresistive element in which direction the first and second electrode films are extended.

14. A thin film magnetic head assembly according to claim 1, wherein said first and second electrode films are electrically connected to said conductive film.

15. A thin film magnetic head assembly according to claim 1, wherein said conductive film includes a cutting portion at its middle portion, and said first or second electrode film is electrically isolated from said first or second shield film at said cutting position.

16. A thin film magnetic head assembly according to claim 1, wherein each of said thin film magnetic head elements comprises at least one metal film which is provided on the first insulating film at a middle portion of said conductive film.

17. A thin film magnetic head assembly according to claim 1, wherein each of the thin film magnetic head elements comprises a third insulating film, a first terminal conductor, a second terminal conductor and a third terminal conductor;

said third insulating film constitutes an outermost layer of the thin film magnetic head;

said first terminal conductor is electrically connected to said second shield film and is covered with said third insulating film;

said second terminal conductor is electrically connected to said first electrode film and is covered with said third insulating film; and said third terminal conductor is electrically connected to said second electrode film and is covered with said third insulating film.

18. A thin film magnetic head assembly according to claim 17, wherein end surfaces of said first, second and third terminal conductors are exposed in the surface of the third insulating film.

19. A thin film magnetic head assembly according to claim 18, wherein each of the thin film magnetic head elements includes a conductive paste layer applied on the surface of the third insulating film and the end surfaces of the first, second and third terminal conductors such that the first, second and third terminal conductors are electrically connected to each other.

20. A thin film magnetic head assembly according to claim 1, wherein said magnetoresistive element has a spin valve structure.

21. A thin film magnetic head assembly according to claim 1, wherein said magnetoresistive element is formed as a ferromagnetic tunnel junction type element.

22. A thin film magnetic head assembly according to claim 1, wherein said magnetoresistive element includes a perovskite type magnetic body.

23. A thin film magnetic head assembly according to claim 1, further comprising inductive type thin film magnetic head elements.

24. A thin film magnetic head assembly according to claim 23, wherein said inductive type thin film magnetic head element has a magnetic circuit a part of which is formed by said second shield film.

25. A method of manufacturing a thin film magnetic head assembly comprising:

forming a thin film magnetic head assembly having an air bearing surface, a substrate and a plurality of thin film magnetic head elements provided on the substrate, each of said thin film magnetic head elements comprising:
a first shield film formed to be supported by said substrate;
a first insulating film formed on said first shield film;
a magnetoresistive element formed on the first insulating film;
first and second electrode films formed on said first insulating film to be connected to respective end portions of the magnetoresistive element;
a second insulating film formed to cover said magnetoresistive element as well as said first and second electrode films;
a second shield film formed on said second insulating film; and
a conductive film formed on said first insulating film such that the conductive film extends outside a side edge of said second shield film in a direction parallel to the air bearing surface viewed in a film stacking direction and is connected to at least one of said first and electrode films as well as to at least one of said first and second shield films; and cutting the conductive films provided in respective thin film magnetic head elements at their middle portions on the thin film magnetic head assembly to separate said first or second electrode film from said first or second shield film.

26. A manufacturing method according to claim 25, wherein said substrate is formed by a wafer and said plurality of thin film magnetic head elements are arranged on the wafer in matrix.

27. A thin film magnetic head assembly according to claim 25, wherein said substrate is formed by a bar and said plurality of thin film magnetic head elements are aligned along a longitudinal direction of the bar.

28. A thin film magnetic head assembly according to claim 25, wherein each of the thin film magnetic head elements comprises a third insulating film, a first terminal conductor, a second terminal conductor and a third terminal conductor;

said third insulating film constitutes an outermost layer of the thin film magnetic head;

said first terminal conductor is electrically connected to said second shield film and is covered with said third insulating film;

said second terminal conductor is electrically connected to said first electrode film and is covered with said third insulating film; and said third terminal conductor is electrically connected to said second electrode film and is covered with said third insulating film; and said third insulating film is polished from its surface to expose end surfaces of said first, second and third terminal conductors.

29. A manufacturing method according to claim 25, wherein each of said thin film magnetic head elements comprises at least one metal film which is provided on the first insulating film at a middle portion of said conductive film and is covered with the third insulating film; and said method further comprises;

a step of polishing said third insulating film from its surface to expose an end surface of said metal film;

a step of removing the exposed metal film by an etching; and a step of cutting said conductive film at its middle portion through a hole formed by removing said metal film.

30. A manufacturing method according to claim 29, wherein after cutting said conductive film at its middle portion, an insulating resistance of said first or second insulating film is measured between said first terminal conductor and at least one of said second and third terminal conductors.

31. A manufacturing method according to claim 30, wherein after measuring the insulating resistance of said first or second insulating film, an electrically conductive paste is applied on the surface of said third insulating film and end surfaces of said first, second and third terminal conductors to electrically connect said first, second and third terminal conductors to each other.

32. A manufacturing method according to claim 25, wherein said conductive film is formed to be connected to said second shield film.

33. A manufacturing method according to claim 25, wherein said conductive film is formed to be connected to said first shield film.

34. A manufacturing method according to claim 25, wherein said conductive film is formed to extend above said first shield film.

35. A manufacturing method according to claim 25, wherein said conductive film is formed to extend forwardly with respect to the magnetoresistive element in a direction in which said first and second electrode films are extended.

36. A manufacturing method according to claim 25, wherein said conductive film is formed by mutually parallel first and second electric connecting paths, and said first electric connecting path includes a connecting conductive film made of a material which can be etched by a wet etching; and said method further includes:
 a step of cutting said first electric connecting path while said second electric connecting path is kept to be short-circuited; and
 a step of removing said connecting conductive film of said second electric connecting path by a wet etching after cutting said first electric connecting path.

37. A manufacturing method according to claim 36, wherein after cutting said conductive film at its middle portion by the wet etching, an insulating resistance of said first or second insulating film is measured between said first terminal conductor and at least one of said second and third terminal conductors.

38. A manufacturing method according to claim 36, wherein said step of forming the conductive film includes a step of forming a first conductive film electrically connected to the fist electrode film and one of said first and second shield films, a second conductive film electrically connected to said first electrode film, and a third conductive film electrically connected to said second electrode film; and
 after forming said connecting conductive film of the second electrical connecting path to be electrically connected to said first to third conductive films through said second insulating film, said first conductive film is cut at its middle portion.

39. A manufacturing method according to claim 38, wherein said connecting conductive films are selectively wet-etched, while the protection film and electrode films surrounding said connecting conductive films are free from the wet etching.

40. A manufacturing method according to claim 36, wherein said step of forming the conductive film includes a step of forming first to fourth conductive films electrically connected to each other by means of connecting conductive films, said first conductive film being electrically connected to the fist electrode film, said second conductive film being electrically connected to said second electrode film, said third conductive film being electrically connected to said second shield film, and said fourth conductive film being electrically connected to said first shield film; and
 after electrically connecting said connecting conductive film of the second electrical connecting path to said first to fourth conductive films through said second insulating film, said connecting conductive films between said first to fourth conductive films are cut.

41. A manufacturing method according to claim 40, wherein said connecting conductive films are selectively wet-etched, while the protection film and electrode films surrounding said connecting conductive films are free from the wet etching.

42. A manufacturing method according to claim 36, wherein said connecting conductive films of the second electric connecting path are formed to be connected to said conductive films within contours of said conductive films wherein said step of forming the conductive.

43. A manufacturing method according to claim 36, wherein after removing said connecting conductive film of said second electrical connecting path, a property is measured, and then a connecting conductive film is formed again.

44. A manufacturing method according to claim 43, wherein said step of forming the connecting conductive film is carried out by nonelectrolytic plating, CVD, resistance heating vapor deposition or coating.

45. A manufacturing method according to claim 36, wherein a measuring pattern having stack structure and electrical connection equivalent to a measuring pattern for the thin film magnetic head element is formed on said wafer substrate.

46. A manufacturing method according to claim 45, wherein after removing by wet etching connecting conductor films of a second electric connecting path of said measuring pattern formed on the wafer substrate, a property is measured, and then a property of a thin film magnetic head element is estimated.

47. A manufacturing method according to claim 25, wherein a plurality of thin film magnetic head elements each including an inductive type thin film magnetic head element are formed.

48. A manufacturing method according to claim 47, wherein said inductive type thin film magnetic head element is formed to have a part of a magnetic circuit is formed by one of said first and second shield films.

* * * * *